US010423551B2

(12) United States Patent
Mishra et al.

(10) Patent No.: US 10,423,551 B2
(45) Date of Patent: Sep. 24, 2019

(54) ULTRA-SHORT RFFE DATAGRAMS FOR LATENCY SENSITIVE RADIO FREQUENCY FRONT-END

(71) Applicant: QUALCOMM Incorporated, San Diego, CA (US)

(72) Inventors: Lalan Jee Mishra, San Diego, CA (US); Helena Deirdre O'Shea, San Diego, CA (US); Richard Dominic Wietfeldt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 15/698,191

(22) Filed: Sep. 7, 2017

(65) Prior Publication Data

US 2019/0073327 A1 Mar. 7, 2019

(51) Int. Cl.
*G06F 13/28* (2006.01)
*H04W 28/06* (2009.01)
*H04L 29/06* (2006.01)
*G06F 13/42* (2006.01)

(52) U.S. Cl.
CPC .......... *G06F 13/28* (2013.01); *G06F 13/4291* (2013.01); *H04L 69/04* (2013.01); *H04W 28/06* (2013.01)

(58) Field of Classification Search
CPC ..... G06F 13/28; G06F 13/4291; H04L 69/04; H04W 28/06

USPC .......................... 370/360–365; 709/209–211
See application file for complete search history.

(56) References Cited

U.S. PATENT DOCUMENTS

| 8,667,317 | B1 | 3/2014 | Kadam et al. |
|---|---|---|---|
| 2004/0008725 | A1 | 1/2004 | McNamara et al. |
| 2015/0193373 | A1 | 7/2015 | Ngo et al. |
| 2015/0286608 | A1 | 10/2015 | Sengoku |
| 2016/0179746 | A1 | 6/2016 | Hein et al. |
| 2016/0364305 | A1 | 12/2016 | Pitigoi-Aron |
| 2017/0116141 | A1 | 4/2017 | Mishra et al. |
| 2017/0118125 | A1 | 4/2017 | Mishra et al. |
| 2017/0124013 | A1 | 5/2017 | Vaillancourt et al. |

OTHER PUBLICATIONS

International Search Report and Written Opinion—PCT/US2018/048872—ISA/EPO—Dec. 14, 2018.

*Primary Examiner* — Thai D Hoang
(74) *Attorney, Agent, or Firm* — Loza & Loza LLP

(57) ABSTRACT

Systems, methods, and apparatus for data communication are provided. A method performed by a device operating as a bus master may include transmitting a first pulse on a first wire of a multi-wire interface, transmitting a second pulse on a second wire of the multi-wire interface while the first pulse is present on the first wire of the multi-wire interface, and initiating a low-latency mode of communication immediately after termination of the first pulse. The second pulse may be shorter in duration than the first pulse.

30 Claims, 20 Drawing Sheets

ULTRA-SHORT RFFE DATAGRAMS FOR LATENCY SENSITIVE RADIO FREQUENCY FRONT-END

TECHNICAL FIELD

The present disclosure relates generally to communication devices, and more particularly, to communications links connecting integrated circuit devices within an apparatus.

BACKGROUND

Serial interfaces have become the preferred method for digital communication between integrated circuit (IC) devices in various apparatus. For example, mobile communications equipment may perform certain functions and provide capabilities using IC devices that include radio frequency transceivers, cameras, display systems, user interfaces, controllers, storage, and the like. General-purpose serial interfaces known in the industry, including the Inter-Integrated Circuit (I2C or $I^2C$) serial bus and its derivatives and alternatives, including interfaces defined by the Mobile Industry Processor Interface (MIPI) Alliance, such as the I3C interface and the radio frequency front-end (RFFE) interface.

In one example, the I2C serial bus is a serial single-ended computer bus that was intended for use in connecting low-speed peripherals to a processor. Some interfaces provide multi-master busses in which two or more devices can serve as a bus master for different messages transmitted on the serial bus. In another example, the RFFE interface defines a communication interface for controlling various radio frequency (RF) front-end devices, including power amplifier (PA), low-noise amplifiers (LNAs), antenna tuners, filters, sensors, power management devices, switches, etc. These devices may be collocated in a single integrated circuit (IC) or provided in multiple IC devices. In a mobile communications device, multiple antennas and radio transceivers may support multiple concurrent RF links. Certain functions can be shared among the front-end devices and the RFFE interface enables concurrent and/or parallel operation of transceivers using multi-master, multi-slave configurations.

As the demand for improved communications between devices continues to increase, there exists a need for improvements in protocols and methods for managing the interfaces between RF front-end devices.

SUMMARY

Certain aspects of the disclosure relate to systems, apparatus, methods and techniques for implementing and managing digital communication interfaces that may be used between IC devices in various apparatus. In some aspects, the digital communication interfaces provide multi-wire communication links between the IC devices. In one example, a multi-wire communication link may transport serialized data on one or more wires of a communication link. According to one aspect, an ultra-short datagram may be configured to minimize latency for certain types of messaging transmitted over the serial bus.

In various aspects of the disclosure, a method performed by a device operating as a bus master may include transmitting a first pulse on a first wire of a multi-wire interface, transmitting a second pulse on a second wire of the multi-wire interface while the first pulse is present on the first wire of the multi-wire interface, and initiating a low-latency mode of communication immediately after termination of the first pulse. The second pulse may be shorter in duration than the first pulse.

In certain aspects, the method includes configuring a register that defines structure of a datagram to be transmitted during the low-latency mode of communication. Configuring the register that defines the structure of the datagram may include configuring a number of bits to represent a slave device address in the datagram. The slave device address may be represented by between 2 and 4 bits. Configuring the register that defines the structure of the datagram may include configuring a number of bits to represent a register address in the datagram. The register address may be represented by between 2 and 8 bits. The method may include configuring a destination register that identifies a base register in a block of registers to be addressed using the register address in the datagram. The base register may be used with an index value to identify a target register in the block of registers. Configuring the register that defines the structure of the datagram may include configuring a number of bits to carry a payload in the datagram. The payload may be carried in between 2 and 8 bits. In some aspects, the register that defines the structure of the datagram may be transmitted to at least one slave device.

In one aspect, the datagram is transmitted using double-data rate encoding.

In one aspect, the method includes selecting a configuration for a datagram to be transmitted during the low-latency mode of communication. A difference in durations of the first pulse and the second pulse may indicate the selected configuration of the datagram.

In various aspects of the disclosure, a method performed by a device operating as a bus master may include transmitting a first pulse on a first wire of a multi-wire interface, transmitting a second pulse on a second wire of the multi-wire interface while the first pulse is present on the first wire of the multi-wire interface, and initiating a high-speed mode of communication immediately after termination of the first pulse. The second pulse may be shorter in duration than the first pulse.

In one aspect the method includes configuring the first pulse to have a first duration, configuring the second pulse to have a second duration, and selecting the high-speed mode of communication from a plurality of modes of communication based on a ratio calculated from the first duration and the second duration. The plurality of modes of communication may include a double-data rate mode of communication, a transition encoded mode of communication, and/or a pulse amplitude modulation mode of communication.

In one aspect the method includes configuring the first pulse to have a first amplitude, configuring the second pulse to have a second amplitude, and selecting the high-speed mode of communication from a plurality of modes of communication based on a ratio of the first and second amplitudes. The plurality of modes of communication may include a pulse amplitude modulation mode of communication, a transition encoded mode of communication, and/or a double-data rate mode of communication.

In one aspect, the method includes transmitting a third pulse on the second wire of the multi-wire interface while the first wire of the multi-wire interface is maintained at logic low, and initiating a low-speed mode of communication immediately after termination of the third pulse. The method may include configuring a first frame structure used for communicating information in the high-speed mode of communication that is different from a second frame structure used for communicating information in the low-speed mode of communication. The method may include transmitting mode information in the low-speed mode of communication to cause the multi-wire interface to transition to a double-data-rate communication mode, and configuring the multi-wire interface to use the second frame structure when operating in the double-data-rate communication mode.

In one example, the multi-wire interface is a radio frequency front end interface. In another example, the multi-wire interface is an I3C interface. In another example, the multi-wire interface includes three or more wires, and one or more modes of communication may be initiated when pulses are transmitted on at least three wires.

In various aspects of the disclosure, an apparatus includes a bus interface adapted to couple the apparatus to a serial bus, and a processing circuit. The processing circuit may be configured to transmit a first pulse on a first wire of a multi-wire interface, transmit a second pulse on a second wire of the multi-wire interface while the first pulse is present on the first wire of the multi-wire interface, and initiate a low-latency mode of communication immediately after termination of the first pulse. The second pulse may be shorter in duration than the first pulse.

In certain aspects, the processing circuit is adapted to configure a register that defines structure of a datagram to be transmitted during the low-latency mode of communication. The processing circuit may be adapted to configure the register that defines the structure of the datagram by configuring a number of bits to represent a slave device address or a register address transmitted in the datagram. The processing circuit may be adapted to configure the register that defines the structure of the datagram by configuring a number of bits to carry a payload in the datagram.

In various aspects of the disclosure, a method performed at a slave device coupled to a bus includes detecting a first pulse on a first wire of a multi-wire interface, detecting a second pulse on a second wire of the multi-wire interface while the first pulse is present on the first wire of the multi-wire interface, and entering a low-latency mode of communication immediately after termination of the first pulse. The second pulse may be shorter in duration than the first pulse.

In certain aspects, the method includes determining a structure of a datagram transmitted during the low-latency mode of communication from bit settings of a first configuration register. The first configuration register may define a number of bits used to represent an address transmitted in the datagram. In one example, the first configuration register defines a number of bits used to represent a slave address transmitted in the datagram, where the slave address may be represented in a field that has a length of between 2 and 4 bits. In another example, the first configuration register defines a number of bits used to represent a register address in the datagram, where the register address is represented in a field that has a length of between 2 and 8 bits.

In some aspects, the method may include using the register address in the datagram to identify a target register in a block of registers, the block of registers commencing at an address identified by a second configuration register, and writing payload data transmitted in the datagram to the target register. The method may include using the register address in the datagram to identify a target register in a block of registers, and transmitting data read from the target register as payload data in the datagram. The block of registers may commence at an address identified by a second configuration register.

In one aspect, the first configuration register defines a number of bits used to carry a payload in the datagram. The payload may be carried in between 2 and 8 bits of the datagram. The datagram may be transmitted using double-data rate encoding.

In various aspects of the disclosure, an apparatus includes a bus interface adapted to couple the apparatus to a serial bus, a plurality of configuration registers, and a processing circuit. The processing circuit may be configured to detect a first pulse on a first wire of a multi-wire interface, detect a second pulse on a second wire of the multi-wire interface while the first pulse is present on the first wire of the multi-wire interface, and cause the bus interface to enter a low-latency mode of communication immediately after termination of the first pulse. The second pulse is shorter in duration than the first pulse.

In certain aspects, the processing circuit is adapted to determine a structure of a datagram transmitted during the low-latency mode of communication from bit settings of a first configuration register. The first configuration register may define a number of bits used to represent an address transmitted in the datagram. The first configuration register may define a number of bits used to represent a slave address or a register address transmitted in the datagram, and where the number of bits lies between 2 and 8 bits.

In certain aspects, the apparatus includes a block of bus-accessible registers. A register address in the datagram may be used to identify a target register in a block of bus-accessible registers. The block of bus-accessible registers may commence at an address identified by a second configuration register. In one example, the processing circuit is adapted to write payload data transmitted in the datagram to the target register. In one example, the processing circuit is adapted to transmit data read from the target register as payload data in the datagram.

In various aspects of the disclosure, an apparatus may be adapted to transmit a first pulse on a first wire of a multi-wire interface, transmit a second pulse on a second wire of the multi-wire interface while the first pulse is present on the first wire of the multi-wire interface, and initiate a high-speed mode of communication immediately after termination of the first pulse. The second pulse may be shorter in duration than the first pulse.

In one aspect the apparatus may be adapted to configure the first pulse to have a first duration, configure the second pulse to have a second duration, and select the high-speed mode of communication from a plurality of modes of communication based on a ratio calculated from the first duration and the second duration. The plurality of modes of communication may include a double-data rate mode of communication, a transition encoded mode of communication, and/or a pulse amplitude modulation mode of communication.

In one aspect the apparatus may be adapted to configure the first pulse to have a first amplitude, configure the second pulse to have a second amplitude, and select the high-speed mode of communication from a plurality of modes of communication based on a ratio of the first and second amplitudes. The plurality of modes of communication may include a pulse amplitude modulation mode of communication, a transition encoded mode of communication, and/or a double-data rate mode of communication.

In one aspect, the apparatus may be adapted to transmit a third pulse on the second wire of the multi-wire interface while the first wire of the multi-wire interface is maintained at logic low, and initiate a low-speed mode of communication immediately after termination of the third pulse. The apparatus may be adapted to configure a first frame structure used for communicating information in the high-speed mode of communication that is different from a second frame structure used for communicating information in the low-speed mode of communication. The apparatus may be adapted to transmit mode information in the low-speed mode of communication to cause the multi-wire interface to transition to a double-data-rate communication mode, and configure the multi-wire interface to use the second frame structure when operating in the double-data-rate communication mode.

In one example, the multi-wire interface is a radio frequency front end interface. In another example, the multi-wire interface is an I3C interface. In another example, the multi-wire interface includes three or more wires, and one or more modes of communication may be initiated when pulses are transmitted on at least three wires.

In various aspects of the disclosure, an apparatus may have means for transmitting a first pulse on a first wire of a multi-wire interface, means for transmitting a second pulse on a second wire of the multi-wire interface while the first pulse is present on the first wire of the multi-wire interface, and means for initiating a high-speed mode of communication immediately after termination of the first pulse. The second pulse may be shorter in duration than the first pulse.

In one aspect apparatus may have means for configuring the first pulse to have a first duration, means for configuring the second pulse to have a second duration, and means for selecting the high-speed mode of communication from a plurality of modes of communication based on a ratio calculated from the first duration and the second duration. The plurality of modes of communication may include a double-data rate mode of communication, a transition encoded mode of communication, and/or a pulse amplitude modulation mode of communication.

In one aspect the apparatus may have means for configuring the first pulse to have a first amplitude, means for configuring the second pulse to have a second amplitude, and means for selecting a ratio of the first and second amplitudes based on a desired mode of communication selected from a plurality of modes of communication. The plurality of modes of communication may include a pulse amplitude modulation mode of communication, a transition encoded mode of communication, and/or a double-data rate mode of communication.

In one aspect, the apparatus may have means for transmitting a third pulse on the second wire of the multi-wire interface while the first wire of the multi-wire interface is maintained at logic low, and means for initiating a low-speed mode of communication immediately after termination of the third pulse. The apparatus may have means for configuring a first frame structure used for communicating information in the high-speed mode of communication that is different from a second frame structure used for communicating information in the low-speed mode of communication. The apparatus may have means for transmitting mode information in the low-speed mode of communication to cause the multi-wire interface to transition to a double-data-rate communication mode, and means for configuring the multi-wire interface to use the second frame structure when operating in the double-data-rate communication mode.

In one example, the multi-wire interface is a radio frequency front end interface. In another example, the multi-wire interface is an I3C interface. In another example, the multi-wire interface includes three or more wires, and one or more modes of communication may be initiated when pulses are transmitted on at least three wires.

In various aspects of the disclosure, a processor readable storage medium is disclosed. The storage medium may be a non-transitory storage medium and may store code that, when executed by one or more processors, causes the one or more processors to transmit a first pulse on a first wire of a multi-wire interface, transmit a second pulse on a second wire of the multi-wire interface while the first pulse is present on the first wire of the multi-wire interface, and initiate a high-speed mode of communication immediately after termination of the first pulse. The second pulse may be shorter in duration than the first pulse.

In one aspect the storage medium may store code for configuring the first pulse to have a first duration, configuring the second pulse to have a second duration, and selecting the high-speed mode of communication from a plurality of modes of communication based on a ratio calculated from the first duration and the second duration. The plurality of modes of communication may include a double-data rate mode of communication, a transition encoded mode of communication, and/or a pulse amplitude modulation mode of communication.

In one aspect the storage medium may store code for configuring the first pulse to have a first amplitude, configuring the second pulse to have a second amplitude, and selecting a ratio of the first and second amplitudes based on a desired mode of communication selected from a plurality of modes of communication. The plurality of modes of communication may include a pulse amplitude modulation mode of communication, a transition encoded mode of communication, and/or a double-data rate mode of communication.

In one aspect, the storage medium may store code for transmitting a third pulse on the second wire of the multi-wire interface while the first wire of the multi-wire interface is maintained at logic low, and initiating a low-speed mode of communication immediately after termination of the third pulse. The storage medium may store code for configuring a first frame structure used for communicating information in the high-speed mode of communication that is different from a second frame structure used for communicating information in the low-speed mode of communication. The storage medium may store code for transmitting mode information in the low-speed mode of communication to cause the multi-wire interface to transition to a double-data-rate communication mode, and configuring the multi-wire interface to use the second frame structure when operating in the double-data-rate communication mode.

In one example, the multi-wire interface is a radio frequency front end interface. In another example, the multi-wire interface is an I3C interface. In another example, the multi-wire interface includes three or more wires, and one or more modes of communication may be initiated when pulses are transmitted on at least three wires.

In various aspects of the disclosure, a method performed by a slave device coupled to a bus may include detecting a first pulse on a first wire of a multi-wire interface, detecting a second pulse on a second wire of the multi-wire interface while the first pulse is present on the first wire of the multi-wire interface, and initiating a high-speed mode of communication immediately after termination of the first pulse. The second pulse may be shorter in duration than the first pulse.

In one aspect, the method includes measuring a first duration associated with the first pulse, measuring a second duration associated with the second pulse, and selecting the high-speed mode of communication from a plurality of modes of communication based on a ratio calculated from the first duration and the second duration. The plurality of modes of communication may include a double-data rate mode of communication, a transition encoded mode of communication, and/or a pulse amplitude modulation mode of communication.

In one aspect the method includes measuring a first amplitude associated with the first pulse, measuring a second amplitude associated with the second pulse, and selecting the high-speed mode of communication from a plurality of modes of communication based on a ratio of the first and second amplitudes. The plurality of modes of communication may include a pulse amplitude modulation mode of communication, a transition encoded mode of communication, and/or a double-data rate mode of communication.

In one aspect, the method includes detecting a third pulse on the second wire of the multi-wire interface while the first wire of the multi-wire interface is maintained at logic low, and initiating a low-speed mode of communication immediately after termination of the third pulse. The method may include configuring a first frame structure used for communicating information in the high-speed mode of communication that is different from a second frame structure used for communicating information in the low-speed mode of communication. The method may include receiving mode information in the low-speed mode of communication, transitioning the multi-wire interface to a double-data-rate communication mode after receiving the mode information, and configuring the multi-wire interface to use the second frame structure when operating in the double-data-rate communication mode.

In one example, the multi-wire interface is a radio frequency front end interface. In another example, the multi-wire interface is an I3C interface.

In various aspects of the disclosure, an apparatus may be adapted to detect a first pulse on a first wire of a multi-wire interface, detect a second pulse on a second wire of the multi-wire interface while the first pulse is present on the first wire of the multi-wire interface, and initiate a high-speed mode of communication immediately after termination of the first pulse. The second pulse may be shorter in duration than the first pulse.

In one aspect, the apparatus may be adapted to measure a first duration associated with the first pulse, measure a second duration associated with the second pulse, and select the high-speed mode of communication from a plurality of modes of communication based on a ratio calculated from the first duration and the second duration. The plurality of modes of communication may include a double-data rate mode of communication, a transition encoded mode of communication, and/or a pulse amplitude modulation mode of communication.

In one aspect the apparatus may be adapted to measure a first amplitude associated with the first pulse, measure a second amplitude associated with the second pulse, and select the high-speed mode of communication from a plurality of modes of communication based on a ratio of the first and second amplitudes. The plurality of modes of communication may include a pulse amplitude modulation mode of communication, a transition encoded mode of communication, and/or a double-data rate mode of communication.

In one aspect, the apparatus may be adapted to detect a third pulse on the second wire of the multi-wire interface while the first wire of the multi-wire interface is maintained at logic low, and initiate a low-speed mode of communication immediately after termination of the third pulse. The apparatus may be adapted to configure a first frame structure used for communicating information in the high-speed mode of communication that is different from a second frame structure used for communicating information in the low-speed mode of communication. The apparatus may be adapted to receive mode information in the low-speed mode of communication, transition the multi-wire interface to a double-data-rate communication mode after receiving the mode information, and configure the multi-wire interface to use the second frame structure when operating in the double-data-rate communication mode.

In one example, the multi-wire interface is a radio frequency front end interface. In another example, the multi-wire interface is an I3C interface.

In various aspects of the disclosure, an apparatus may have means for detecting a first pulse on a first wire of a multi-wire interface, means for detecting a second pulse on a second wire of the multi-wire interface while the first pulse is present on the first wire of the multi-wire interface, and means for initiating a high-speed mode of communication immediately after termination of the first pulse. The second pulse may be shorter in duration than the first pulse.

In one aspect, the apparatus may have means for measuring a first duration associated with the first pulse, means for measuring a second duration associated with the second pulse, and means for selecting the high-speed mode of communication from a plurality of modes of communication based on a ratio calculated from the first duration and the second duration. The plurality of modes of communication may include a double-data rate mode of communication, a transition encoded mode of communication, and/or a pulse amplitude modulation mode of communication.

In one aspect the apparatus includes means for measuring a first amplitude associated with the first pulse, means for measuring a second amplitude associated with the second pulse, and means for selecting the high-speed mode of communication from a plurality of modes of communication based on a ratio of the first and second amplitudes. The plurality of modes of communication may include a pulse amplitude modulation mode of communication, a transition encoded mode of communication, and/or a double-data rate mode of communication.

In one aspect, the apparatus may have means for detecting a third pulse on the second wire of the multi-wire interface while the first wire of the multi-wire interface is maintained at logic low, and means for initiating a low-speed mode of communication immediately after termination of the third pulse. The apparatus may have means for configuring a first frame structure used for communicating information in the high-speed mode of communication that is different from a second frame structure used for communicating information in the low-speed mode of communication. The apparatus may have means for receiving mode information in the low-speed mode of communication, means for transitioning the multi-wire interface to a double-data-rate communication mode after receiving the mode information, and means for configuring the multi-wire interface to use the second frame structure when operating in the double-data-rate communication mode.

In one example, the multi-wire interface is a radio frequency front end interface. In another example, the multi-wire interface is an I3C interface.

In an aspect of the disclosure, a processor readable storage medium is disclosed. The storage medium may be a non-transitory storage medium and may store code that, when executed by one or more processors, causes the one or more processors to detect a first pulse on a first wire of a multi-wire interface, detect a second pulse on a second wire of the multi-wire interface while the first pulse is present on the first wire of the multi-wire interface, and initiate a high-speed mode of communication immediately after termination of the first pulse. The second pulse may be shorter in duration than the first pulse.

In one aspect, the storage medium may store code for measuring a first duration associated with the first pulse, measuring a second duration associated with the second pulse, and selecting the high-speed mode of communication from a plurality of modes of communication based on a ratio calculated from the first duration and the second duration. The plurality of modes of communication may include a double-data rate mode of communication, a transition encoded mode of communication, and/or a pulse amplitude modulation mode of communication.

In one aspect the storage medium may store code for measuring a first amplitude associated with the first pulse, measuring a second amplitude associated with the second pulse, and selecting the high-speed mode of communication from a plurality of modes of communication based on a ratio of the first and second amplitudes. The plurality of modes of communication may include a pulse amplitude modulation mode of communication, a transition encoded mode of communication, and/or a double-data rate mode of communication.

In one aspect, the storage medium may store code for detecting a third pulse on the second wire of the multi-wire interface while the first wire of the multi-wire interface is maintained at logic low, and initiating a low-speed mode of communication immediately after termination of the third pulse. The storage medium may store code for configuring a first frame structure used for communicating information in the high-speed mode of communication that is different from a second frame structure used for communicating information in the low-speed mode of communication. The storage medium may store code for receiving mode information in the low-speed mode of communication, transitioning the multi-wire interface to a double-data-rate communication mode after receiving the mode information, and configuring the multi-wire interface to use the second frame structure when operating in the double-data-rate communication mode.

In one example, the multi-wire interface is a radio frequency front end interface. In another example, the multi-wire interface is an I3C interface.

DETAILED DESCRIPTION

Figure 1:
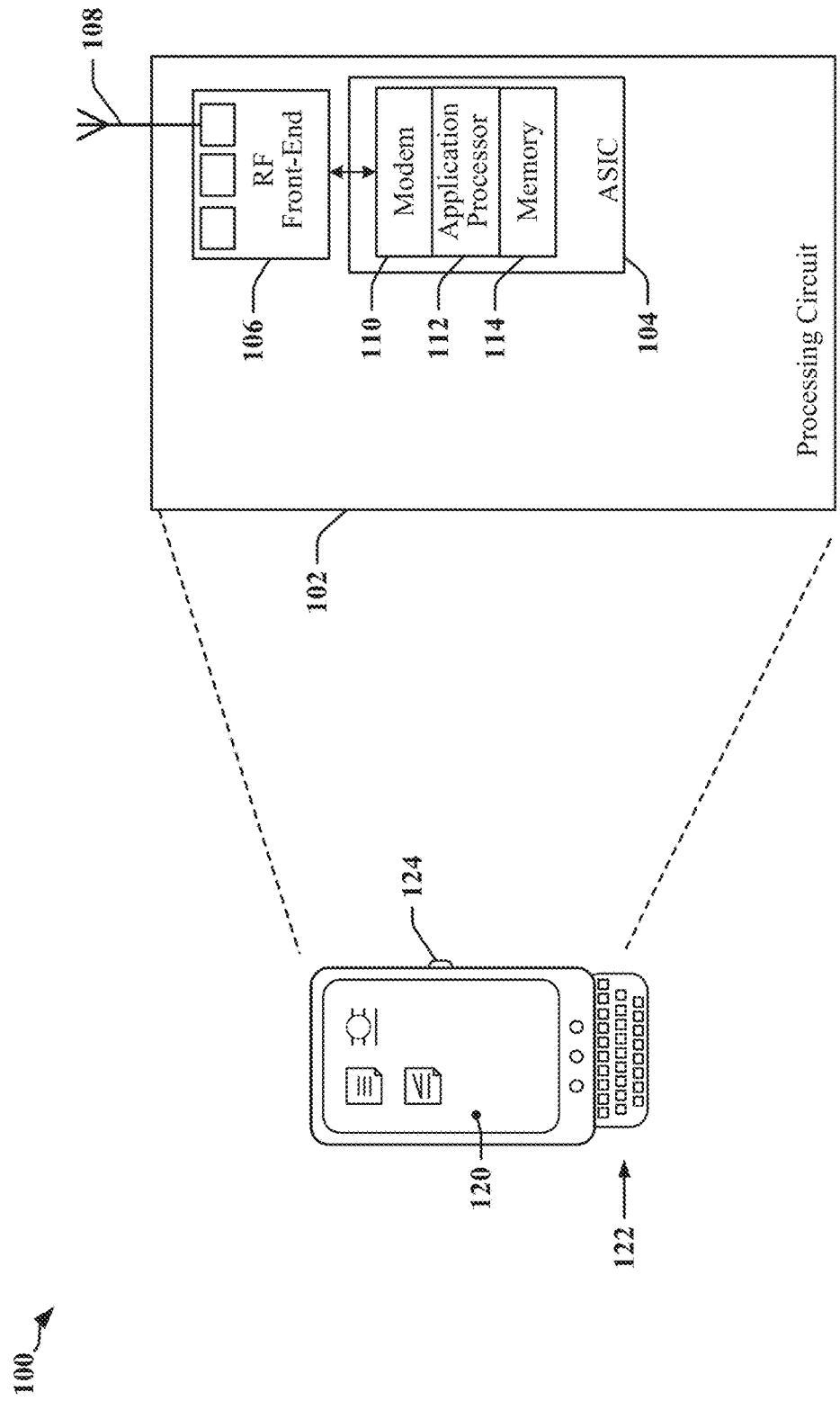
FIG. 1 illustrates an apparatus that includes an RF front-end and that may be adapted according to certain aspects disclosed herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

The Radio Frequency Front-End (RFFE) interface defined by the MIPI alliance provides a communication interface for controlling various radio frequency (RF) front-end devices, including power amplifier (PA), low-noise amplifiers (LNAs), antenna tuners, filters, sensors, power management devices, switches, etc. These devices may be collocated in a single integrated circuit (IC) or provided in multiple IC devices. In a mobile communications device, multiple antennas and radio transceivers may support multiple concurrent RF links.

Emerging 5G RF Front-End circuits demand an ultrashort bus latency on the RFFE bus, where the latency may be less than 1 μs. Current RFFE implementations employ a packet structure that does not permit the RFFE bus to operate with the required latency.

RFFE defines a sequence start code (SSC) and a pre-defined set of datagram structures. A datagram transmitted on the RFFE bus may have a structure that includes an SSC, a header, a payload and terminating signaling. The existing SSC is recognized by all RFFE devices coupled to the RFFE bus and it is not possible to create or use datagram structures that are not in the pre-defined set of datagram structures without causing device compatibility issues. However, improved datagram structures are needed to achieve the low latencies required for 5G implementations.

Certain aspects of the invention provide a modified SSC and low-latency datagram structures that enable fast bus transactions and permit 5G latency requirements to be met while allowing co-existence with legacy devices. In one aspect, the modified SSC scheme disclosed herein support configurable low-latency encoding modes, in addition to shortened datagram structures.

In some instances, a modified SSC may be provided that encodes additional information that enables a master device to signal a mode of operation to be implemented following the SSC. In one example, the modified SSC may allow a master device to initiate low-latency transactions with different configurations of datagrams, and/or to implement tradeoffs between datagram size and latency. In another example, the modified SSC may select between encoding modes, such as DDR and SDR, modes. In another example, the modified SSC may select a low-latency configuration and encoding combination.

Legacy devices do not recognize the improved SSC because the clock line is driven high for a first period of time, and a pulse is provided on the data line while the clock line is high. In a conventional SSC, the clock is kept low while a pulse is provided on the data line. An improved ultra-short datagram transmitted after the improved SSC is ignored by legacy RFFE devices.

The improved ultra-short datagram can include the same fields found in RFFE-defined datagram structures, but with reduced field sizes with respect to the RFFE-defined datagram structures. The shortened datagram can enable lower latency goals to be met. For example, the slave address field of 8 bits may be replaced with a field that is 2-4 bits in size. 8-bit register addresses, command codes and 8-bit payloads may also be reduced in size. The master may configure the slave with information describing the format and size of the ultra-short datagram.

A modified SSC can may identify a mode of encoding used for transmission on the RFFE bus in low-latency mode, for example, by manipulating the duty-cycle of pulses transmitted on the clock and data lines. The SSC duty-cycle may be defined as the ratio of the pulse width on the data line to the pulse width on the clock line. For example, four different SSC duty-cycles can be selected to identify four different modes of encoding used with an ultra-short datagram. Modes of encoding may include single data rate, double data rate, ternary modes of encoding.

Example of an Apparatus with Multiple IC Device Subcomponents

Certain aspects of the invention may be applicable to communications links deployed between electronic devices that include subcomponents of an apparatus such as a telephone, a mobile computing device, an appliance, automobile electronics, avionics systems, etc. FIG. 1 depicts an apparatus 100 that may employ a communication link between IC devices. In one example, the apparatus 100 may be a mobile communication device. The apparatus 100 may include a processing circuit having two or more IC devices 104, 106 that may be coupled using a first communication link. One IC device may be an RF front-end device 106 that enables the apparatus to communicate through one or more antennas 108 with a radio access network, a core access network, the Internet and/or another network. The RF front-end device 106 may include a plurality of devices coupled by a second communication link, which may include an RFFE bus.

The processing circuit 102 may include one or more application-specific IC (ASIC) devices 104. In one example, an ASIC device 104 may include and/or be coupled to one or more processing devices 112, logic circuits, one or more modems 110, and processor readable storage such as a memory device 114 that may maintain instructions and data that may be executed by a processor on the processing circuit 102. The processing circuit 102 may be controlled by one or more of an operating system and an application programming interface (API) layer that supports and enables execution of software modules residing in storage media. The memory device 114 may include read-only memory (ROM) or random-access memory (RAM), electrically erasable programmable ROM (EEPROM), flash cards, or any memory device that can be used in processing systems and computing platforms. The processing circuit 102 may include or have access to a local database or parameter storage that can maintain operational parameters and other information used to configure and operate apparatus 100. The local database may be implemented using one or more of a database module, flash memory, magnetic media, EEPROM, optical media, tape, soft or hard disk, or the like. The processing circuit may also be operably coupled to external devices such as the antennas 108, a display 120, operator controls, such as a button 124 and/or an integrated or external keypad 122, among other components.

Overview of the RFFE Bus

Figure 2:
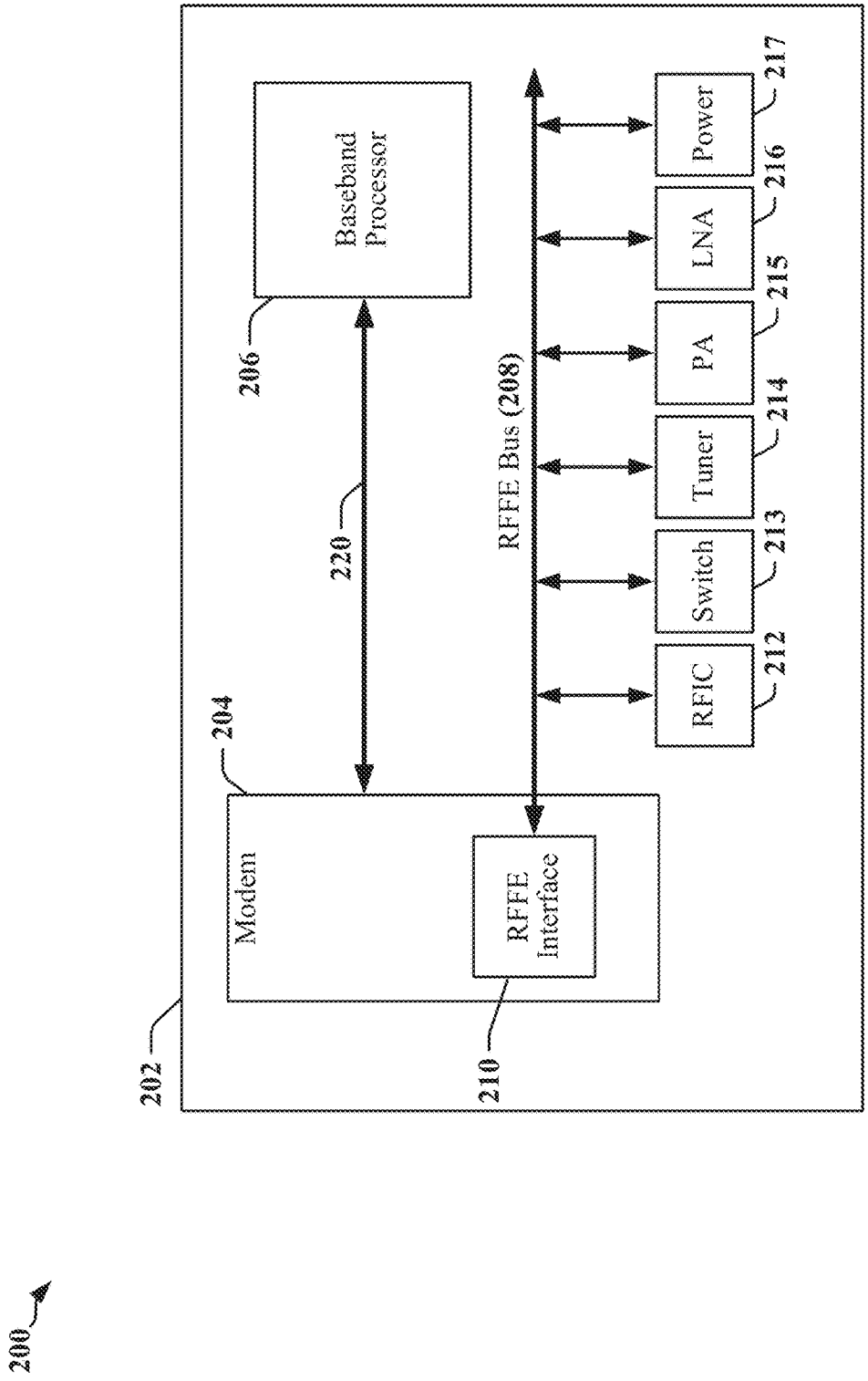
FIG. 2 is a block diagram illustrating a device that employs an RFFE bus to couple various front-end devices.

FIG. 2 is a block diagram 200 illustrating an example of a device 202 that employs an RFFE bus 208 to couple various front-end devices 212-217. A modem 204 may also be coupled to the RFFE bus 208. In various examples, the device 202 may be implemented with one or more baseband processors 206, one or more other communication links 220, and various other busses, devices and/or different functionalities. In the example, the modem 204 may communicate with a baseband processor 206, and the device 202 may be embodied in one or more of a mobile computing device, a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, avionics systems, a wearable computing device (e.g., a smart watch, a health or fitness tracker, eyewear, etc.), an appliance, a sensor, a security device, a vending machine, a smart meter, a drone, a multicopter, or any other similar functioning device.

The RFFE bus 208 may be coupled to an RF integrated circuit (RFIC) 212, which may include one or more controllers, and/or processors that configure and control certain aspects of the RF front-end. The RFFE bus 208 may couple the RFIC 212 to a switch 213, an RF tuner 214, a power amplifier (PA) 215, a low noise amplifier (LNA) 216 and a power management module 217.

Figure 3:
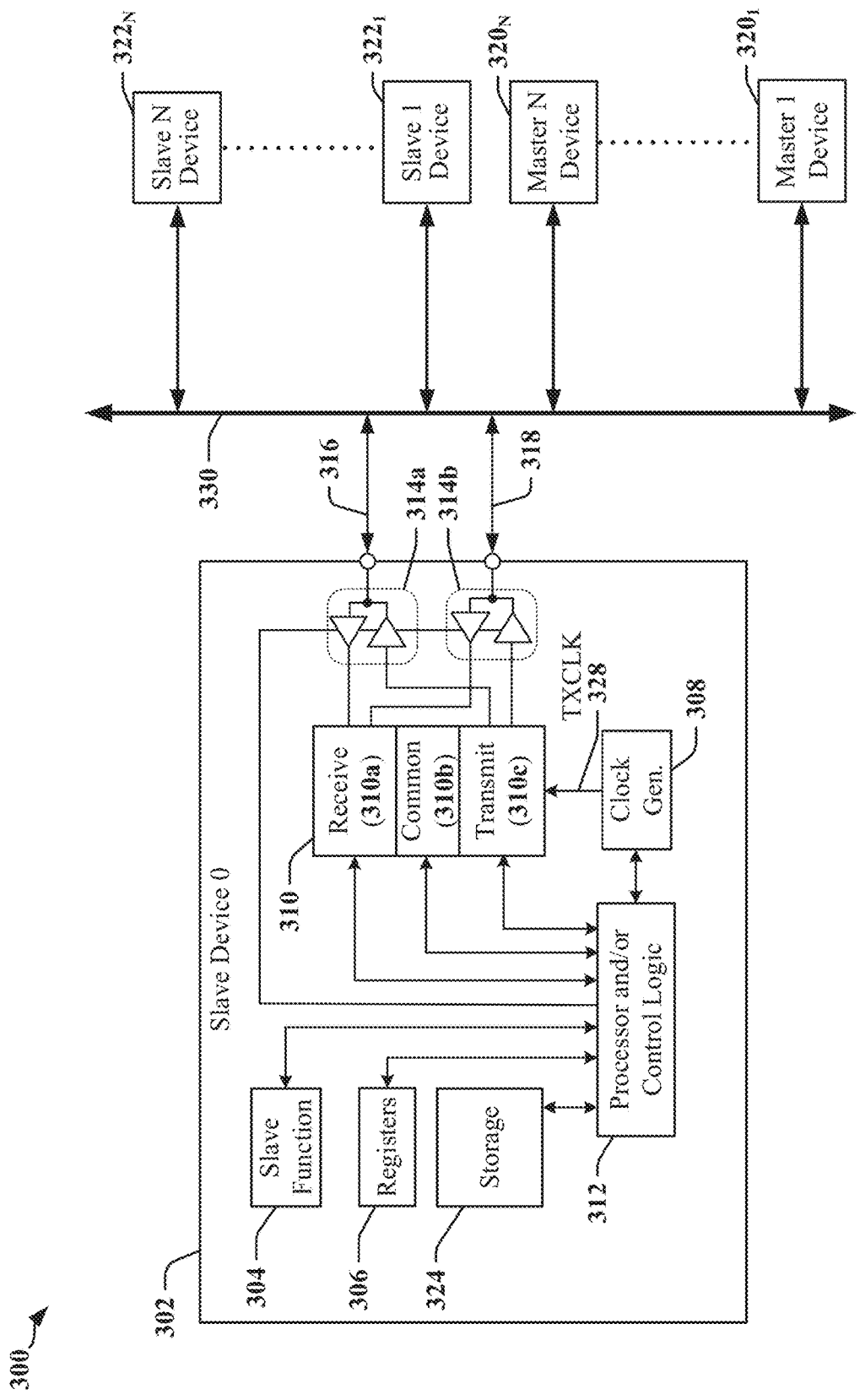
FIG. 3 illustrates an example of a system architecture for an apparatus employing a data link between IC devices according to certain aspects disclosed herein.

FIG. 3 is a block schematic diagram illustrating an example of an architecture for a device 300 that may employ an RFFE bus 330 to connect bus master devices $320_1\text{-}320_N$ and slave devices 302 and $322_1\text{-}322_N$. The RFFE bus 330 may be configured according to application needs, and access to multiple busses 330 may be provided to certain of the devices $320_1\text{-}320_N$, 302, and $322_1\text{-}322_N$. In operation, one of the bus master devices $320_1\text{-}320_N$ may gain control of the bus and transmit a slave identifier (slave address) to identify one of the slave devices 302 and $322_1\text{-}322_N$ to engage in a communication transaction. Bus master devices $320_1\text{-}320_N$ may read data and/or status from slave devices 302 and $322_1\text{-}322_N$, and may write data to memory or may configure the slave devices 302 and $322_1\text{-}322_N$. Configuration may involve writing to one or more registers or other storage on the slave devices 302 and $322_1\text{-}322_N$.

In the example illustrated in FIG. 3, a first slave device 302 coupled to the RFFE bus 330 may respond to one or more bus master devices $320_1\text{-}320_N$, which may read data from, or write data to the first slave device 302. In one example, the first slave device 302 may include or control a power amplifier (see the PA 215 in FIG. 2), and one or more bus master devices $320_1\text{-}320_N$ may from time-to-time configure a gain setting at the first slave device 302.

The first slave device 302 may include configuration registers 306 and/or other storage devices 324, a processing circuit and/or control logic 312, a transceiver 310 and a number of line driver/receiver circuits 314*a*, 314*b* as needed to couple the first slave device 302 to the RFFE bus 330. The processing circuit and/or control logic 312 may include a processor such as a state machine, sequencer, signal processor or general-purpose processor. The transceiver 310 may include one or more receivers 310*a*, one or more transmitters 310*c* and certain common circuits 310*b*, including timing, logic and storage circuits and/or devices. In some instances, the transceiver 310 may include encoders and decoders, clock and data recovery circuits, and the like. A transmit clock (TXCLK) signal 328 may be provided to the transmitter 310*c*, where the TXCLK signal 328 can be used to determine data transmission rates.

The RFFE bus 330 is typically implemented as a serial bus in which data is converted from parallel to serial form by a transmitter, which transmits the encoded data as a serial bitstream. A receiver processes the received serial bitstream using a serial-to-parallel convertor to deserialize the data. The serial bus may include two or more wires, and a clock signal may be transmitted on one wire with serialized data being transmitted on one or more other wires. In some instances, data may be encoded in symbols, where each bit of a symbol controls the signaling state of a wire of the RFFE bus 330.

Sequence Start Conditions on a Radio Frequency Front End Bus

Certain aspects disclosed herein relate to the signaling that is used to initiate transactions on an RFFE interface and on certain other types of interface. In the RFFE interface, and similar interfaces, a unique signaling combination is transmitted on two or more wires of a communication bus to indicate the start of a data transmission. In one example, the RFFE bus 330 is a two-wire serial bus and the unique signaling combination that indicates the start of data transmission is transmitted on the clock and data lines of the serial bus.

Figure 4:
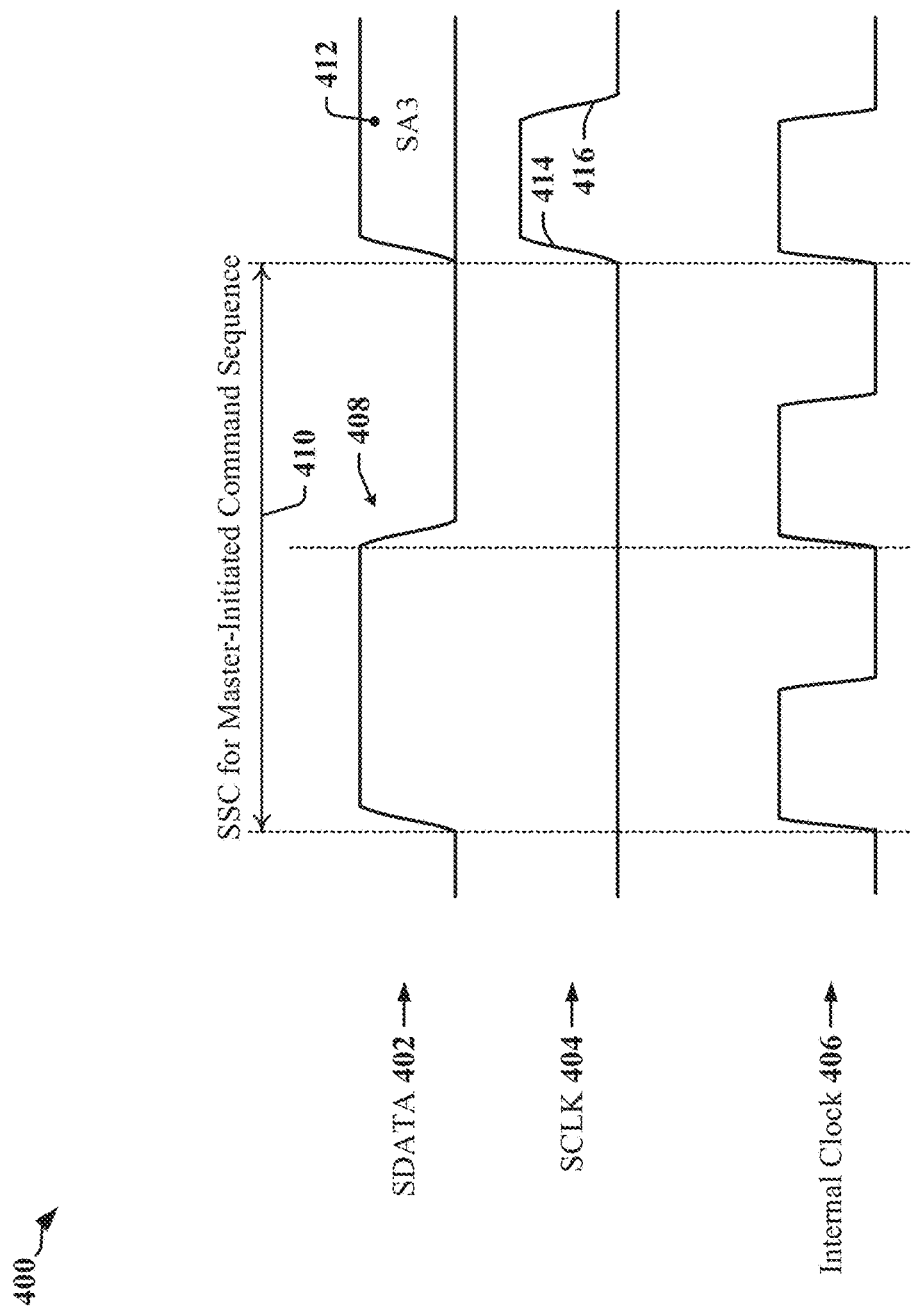
FIG. 4 illustrates a sequence start condition used in an RFFE interface.

FIG. 4 is a timing diagram 400 that illustrates a sequence start condition (SSC 410) used in an RFFE interface to indicate the start of a valid data-frame 412, which may include one or more information fields. The SSC 410 is defined by signaling on the data line (SDATA 402) and clock line (SCLK 404) that occurs within a time period on which the interface is otherwise idle. The SSC 410 in an RFFE interface is defined by a pulse 408 transmitted on SDATA 402 while SCLK 404 is held in a low logic state. Devices monitoring the RFFE bus are configured to ignore transmissions that are not preceded by an SSC 410.

An internal clock signal 406 that is used by a transmitting device to control transmission of the data-frame 412 may be provided on SCLK 404 while the data-frame 412 is transmitted. Edges 414 and/or 416 one SCLK 404 may be used to capture data transmitted on SDATA 402. In one mode of communication on the RFFE interface, data transmissions on SDATA 402 may be controlled by rising edges 414 on the SCLK 404. This mode of communication may be referred to as single data rate (SDR) mode of communication. Some implementations of the RFFE interface can support a double data rate (DDR) mode of communication, where data transmissions on SDATA 402 may be controlled by rising edges 414 and falling edges 416 on the SCLK 404.

Specifications governing the operation of RFFE interfaces provide for entry to the DDR mode of communication from the SDR mode of communication. According to these specifications, a transaction on the RFFE bus is initiated and data is initially transmitted in the SDR mode of communication. The initial SDR data transmission includes information that causes a switch or transition to the DDR mode of communication. Accordingly, conventional RFFE interfaces may be configured for SDR mode of communication, or for a mixed mode of communication where both SDR and DDR transmissions occur within a single transaction.

Figure 5:
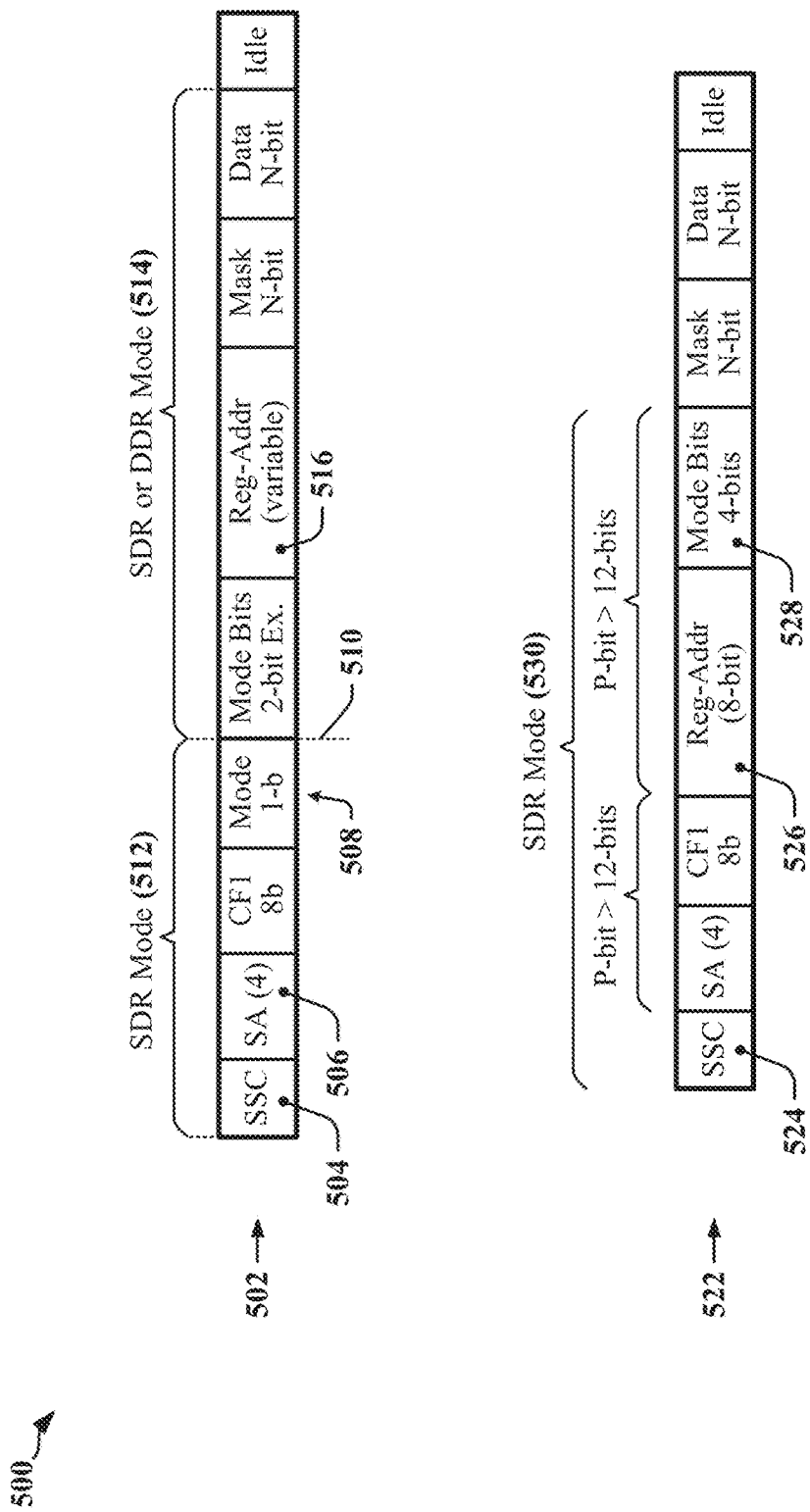
FIG. 5 illustrates transmissions used to select between communication modes in an RFFE interface.

The diagram 500 of FIG. 5 illustrates two examples of transmissions 502, 522 that can select between SDR and DDR modes in a conventional RFFE interface. The transmissions 502, 522 illustrate alternative protocols for an extended register write transaction. Other types of transaction may be performed in a manner similar to the illustrated extended register write transactions. In the extended register write transaction, a host or master device may transmit data to be written into a register of a peripheral device or slave device.

In the first transmission 502, the SSC 504 is transmitted to commence the register write transaction. A slave address 506 is transmitted after the SSC 504. The transmission is conducted in SDR mode 512 until at least a point in time 510 occurring after mode information 508 is transmitted. The mode information 508 indicates whether the remainder of the transmission 514 is conducted in SDR mode or DDR mode. In the second transmission 522, an alternative protocol is employed in which a register address 526 is transmitted with expanded mode information 528 in the SDR mode of communication that commences with the SSC 524. In this transmission 522, the duration of the SDR mode 530 is increased with respect to the SDR mode 512 in the first transmission 502.

In the examples illustrated in FIG. 5, a considerable portion of a mixed-mode transmission is spent in SDR mode 512, 530, before the RFFE interface enters DDR mode. The delay in entering DDR mode may increase as new protocol enhancements (see transmission 522) are implemented. Emerging RFFE architectures provide for convergence of RF paths between wireless wide area network (WWAN) and wireless local area network (WLAN) components, resulting in more stringent RFFE timing requirements, which can result in a demand for faster rate of data transactions.

Mixed SDR/DDR mode operation, which may be employed to meet increased data rate demands, can only partially reduce data transfer latencies due to the inability of current RFFE interfaces to enter directly into a DDR mode of communication or into another high data-rate (HDR) mode of communication. The period of time spent transferring part of the data-frame in SDR mode 512, 530 limits the effectiveness of latency reduction sought through the use of DDR modes, when at least the first 12-bits and a parity bit are required to be transferred using SDR signaling.

Sequence Start Conditions for Low-Latency RFFE Communications

According to certain aspects disclosed herein, a modified SSC may be used to enable certain modes of communication that extend capabilities provided by a bus protocol. In one example, certain devices adapted to recognize the modified SSC may enter a mode of operation in which ultra-short RFFE datagrams may be used to communicate low-latency information between devices. Legacy RFFE devices coupled to the RFFE bus ignore the modified SSC and the ultra-short RFFE datagrams that follow the modified SSC. A modified SSC may be defined for RFFE interfaces and for other interfaces that use a multi-wire bus. For example, a modified SSC may be defined for interfaces that operate in accordance with I2C and/or I3C protocols, and derivatives of such protocols.

Ultra-short RFFE datagrams may be configured to support emerging standards for 3GPP 5G devices that include an RF Front-End that demands ultra-short bus latency on RFFE bus. In one example, latencies of less than 1 µs may be required. Conventional RFFE packet structures defined by RFFE bus standards cannot meet the low-latency requirements for 5G RF Front-Ends. A different, shorter datagram format that meets latency requirements for 5G RF Front-Ends may be defined for transmission over an RFFE bus, but such shorter datagram would be incompatible with legacy protocols, and consequently may be inoperative on a bus that to which legacy RFFE devices are coupled.

In accordance with certain aspects disclosed herein, a modified SSC may be transmitted to signal that modified-format datagrams are to be transmitted. In one implementation, the modified-format datagrams are ultra-short datagrams that permit communication involving a 5G RF Front-Ends with latencies of less than 1 Cps, while legacy devices ignore the modified SSC and modified-format datagrams that follow the modified SSC. The modified SSC can be configured to meet signaling specifications for both data and clock lines of an RFFE bus without causing conflict with legacy RFFE signaling schemes. In some instances, the modified-format datagrams may support variable field-lengths. For example, one modified datagram structure may support variable length fields that carry slave addresses, command codes, register addresses, data payloads and/or other fields as needed or desired. Field lengths may be defined using configuration registers. A datagram termination scheme using a BPC (Bus Park Cycle) and/or using a predefined clock cycle count.

Figure 6:
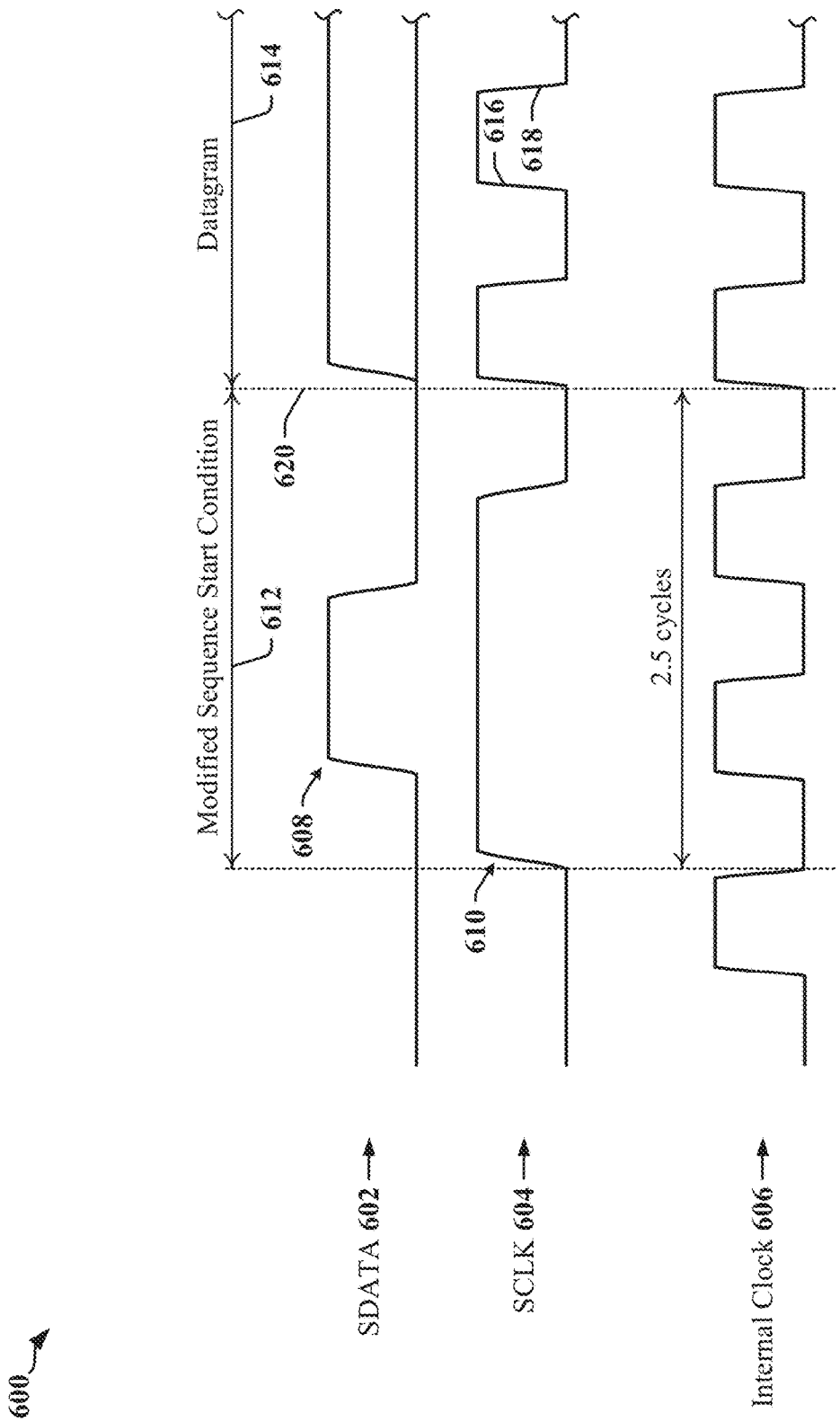
FIG. 6 illustrates a first example of a modified sequence start condition that may be used to facilitate direct entry to one or more communication modes in accordance with certain aspects disclosed herein.

The timing diagram 600 of FIG. 6 illustrates one example in which a modified SSC 612 may be used to facilitate entry to one or more modes of communication, and/or to indicate transmission a low-latency datagram 614. The modified SSC 612 may be defined by signaling transmitted on the data line (SDATA 602) and clock line (SCLK 604). The modified SSC 612 may include a pulse 608 that is transmitted as on SDATA 602 while SCLK 604 is held in a high logic state. The modified SSC 612 may be transmitted while the RFFE bus is idle. The modified SSC 612 may be transmitted after a BPC is transmitted on the RFFE bus, where the BPC is transmitted by the master device as a low signaling state on SDATA 602 for a clock period of the clock signal transmitted on SCLK 604. The master device may release SDATA 602 during a BPC to enable a slave device to assert an interrupt.

Legacy devices monitoring an idle RFFE bus are configured to ignore transmissions that are not preceded by the SSC 410 illustrated in FIG. 4, where SCLK 404 remains low for the duration of a pulse 408 on SDATA 402. The modified SSC 612 is ignored by devices operating in accordance with legacy RFFE protocols because the entirety of the pulse 608 on SDATA 602 is transmitted while a pulse 610 is transmitted on SCLK 604 after occurrence of a BPC. The modified SSC 612 is not recognized as signaling associated with in-band interrupt procedures provided by RFFE standards.

Figure 7:
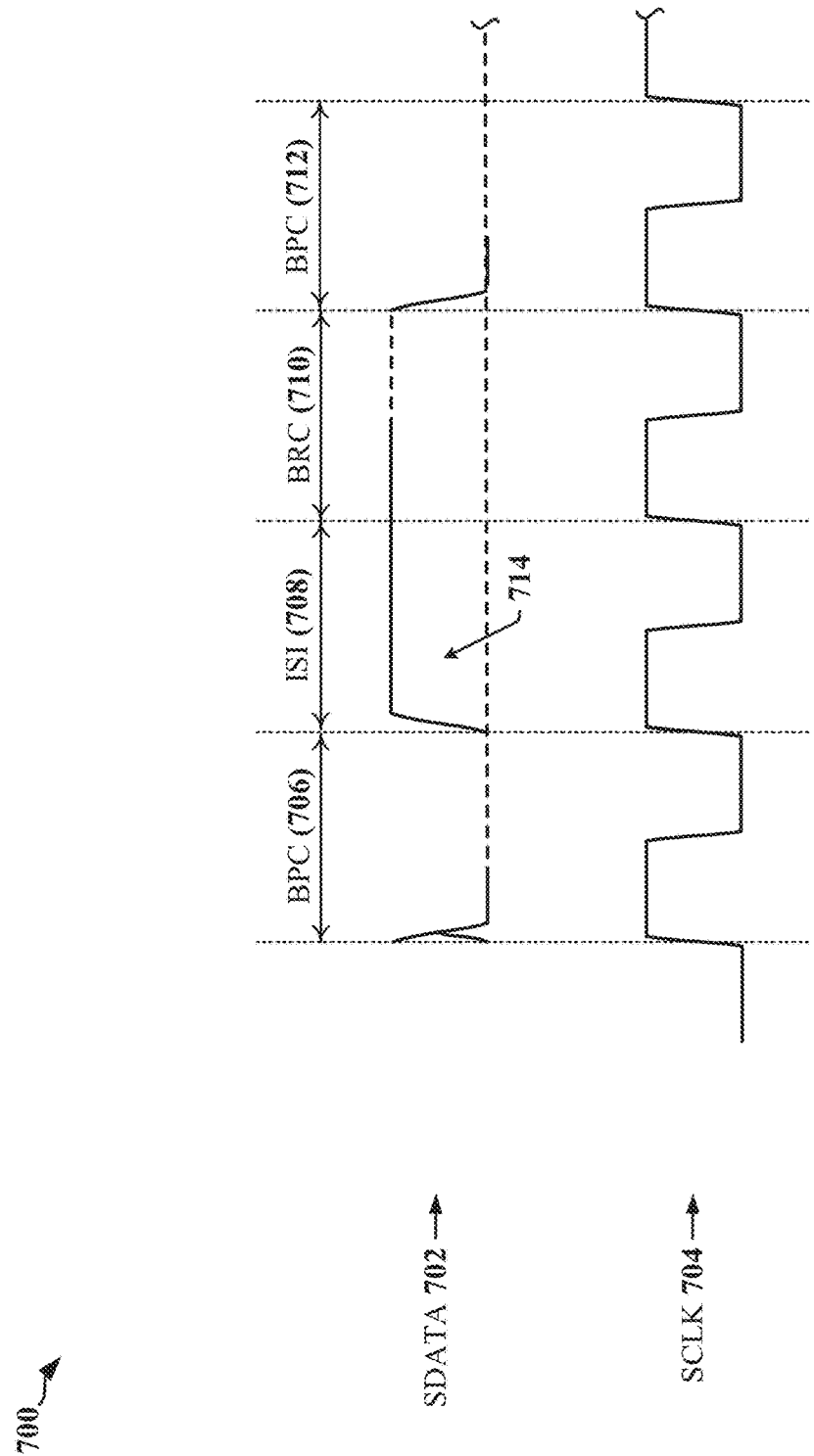
FIG. 7 illustrates an in-band interrupt process in accordance with RFFE standards.

FIG. 7 is a timing diagram illustrating an in-band interrupt 700 provided by RFFE standards. A slave device may assert an interrupt during an interrupt summary indication (ISI) cycle 708 that follows an initial BPC cycle 706. The slave device indicates an interrupt by driving SDATA 702 high for a period of time 714 that includes substantially all of the ISI cycle 708 and a portion of the bus release cycle (BRC) 710. A second BPC 712 then returns the RFFE bus to an idle state. Each cycle 706, 708, 710, 712 is defined by the period of a signal transmitted on SCLK 704. The in-band interrupt 700 cause both SDATA 702 and SCLK 704 to be high at the same time after the initial BPC cycle 706. However, SCLK 704 does not remain high while SDATA 702 is high since, by definition, SDATA 702 is high for at least one clock period, where during each clock period, the state of SCLK 704 alternates between high and low periods. Therefore, a legacy device would not mistake a modified SSC 612 (see FIG. 6) for an in-band interrupt, in which SCLK 604 is in a high state before SDATA 602 transitions to the high state and SDATA 602 transitions low before SCLK 604 returns to the low state.

When the modified SSC 612 is transmitted, devices adapted to recognize the modified SSC 612 may enter a mode of communication in which ultra-short RFFE datagrams are transmitted at a point in time 620 after the modified SSC 612 is terminated. An internal transmitter clock 606 may be the source of the clock signal transmitted on SCLK 604. The ultra-short RFFE datagrams may be transmitted over the RFFE bus in accordance with a high-speed mode of operation, including DDR and ternary modes for example.

According to certain aspects, the timing relationship between the signaling characteristics of the pulse 608 transmitted on SDATA 602 and the pulse 610 transmitted on SCLK 604, which generate the modified SSC 612 may be configured to convey a mode of operation for the RFFE bus. The mode of operation may identify a configuration for ultra-short RFFE datagrams, and/or a high-speed protocol to be used to transmit the ultra-short RFFE datagrams. In one example, the relative position of the pulses 608, 610 and/or differences in duration of the pulses 608, 610 may encode information used to configure the mode of communication. The encoding of additional information can enable faster data transmission techniques and/or lower latencies.

Example of a Modified SSC that Selects a Ultra-Short Datagram Configuration

Figure 8:
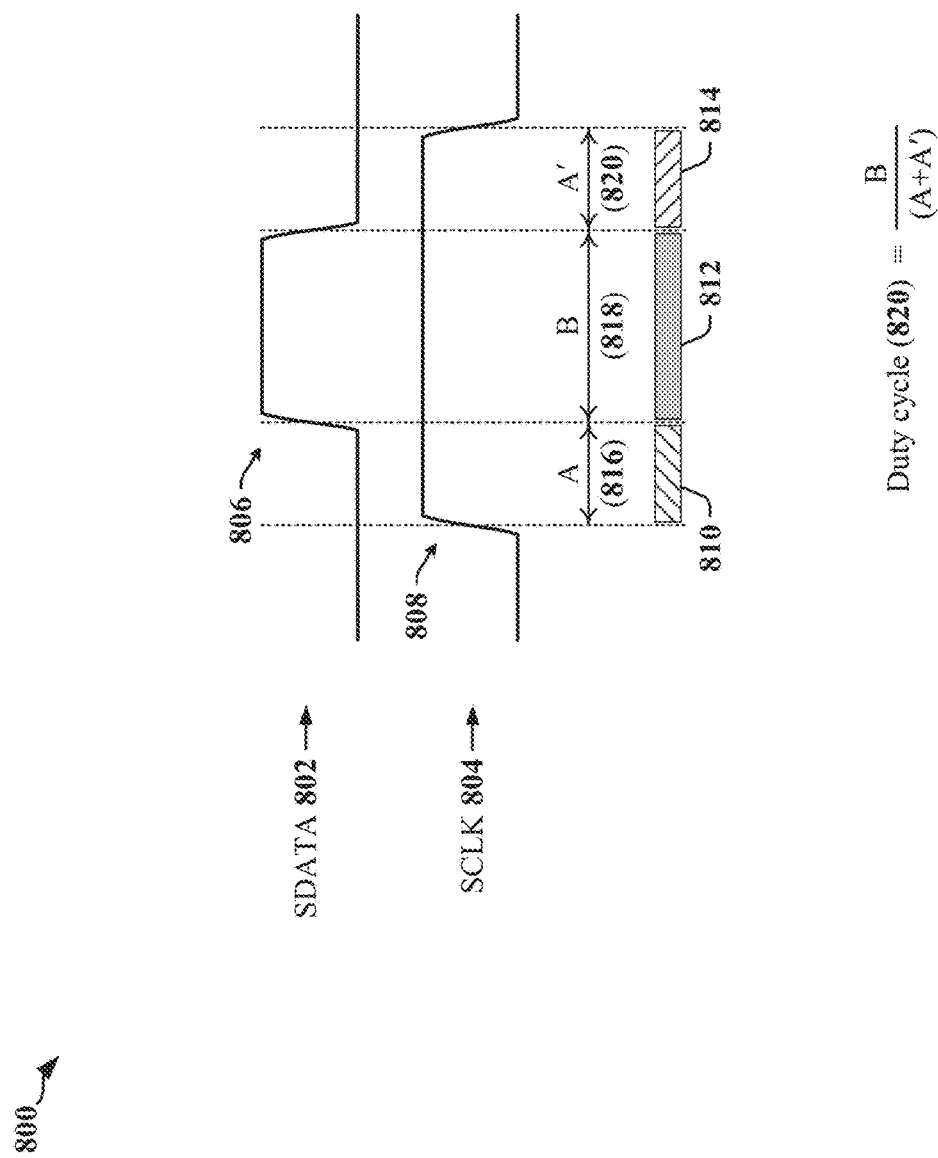
FIG. 8 illustrates characteristics of a versatile sequence start condition that may be exploited to configure a mode of communication in accordance with certain aspects disclosed herein.

With reference now to FIG. 8, certain characteristics of a modified SSC 800 may be exploited to encode information related to mode of communication, protocol, link control, etc. The modified SSC 800 may be provided as a pulse 806 transmitted on SDATA 802 while a pulse 808 is transmitted on SCLK 804. The pulse 808 on SCLK 804 has a duration that is greater than the duration of the pulse 806 on SDATA 802. Information may be encoded in a duty cycle 820 corresponding to the ratio of the duration of the pulses 806, 808. In the illustrated example, the duty cycle 820 may be calculated by dividing the duration (B 818) of the pulse 806 on SDATA 802 by the total time (A 816 added to A' 820) by which the duration of the pulse 808 on SCLK 804 exceeds the duration of the pulse 806 on SDATA 802. The various durations may be measured using counters, timers, or the like. For example, a system clock may be gated to two counters by logic, where first logic enables a first counter when SCLK 804 is in a high logic state and SDATA 802 is in a low logic state, and enables a second counter when SCLK 804 is in a high logic state and SDATA 802 is also in a high logic state. At the end of the modified SSC 800, the output of the first counter represents the divisor (A+A') and the output of the second counter represents the dividend (B).

In some examples, four different duty cycles (DC-1, DC-2, DC-3, DC-4) can be defined with sufficient guard band to prevent misidentification or miscalculation of the duty cycle. In these examples, a receiver may be configured to recognize four unique SSCs using the same baseline signaling scheme. In one example, the different SSCs may be used to indicate or index a configuration of ultra-short RFFE datagrams and mode of communication. In another example, the different SSCs may be used to directly indicate a mode of communication to be entered after the SSC has been terminated. Table 1 illustrates one example of communication mode selection based on duty cycle.

TABLE 1

| Duty Cycle | Communication Mode |
|---|---|
| DC-1 | Ultra-Short Packet using SDR mode signaling |
| DC-2 | Ultra-Short Packet using DDR mode signaling |
| DC-3 | Ultra-Short Packet using Ternary mode signaling |
| DC-4 | Reserved |

In some implementations, an interface may be configurable to encode data using pulse amplitude modulation (PAM). In these implementations, a PAM-based modified SSC may be used to facilitate direct entry by a device into one or more modes of communication. For example, a PAM-based modified SSC may be provided by transmitting a first pulse with a first amplitude and transmitting a second pulse with a second amplitude, where the first and second amplitudes are defined by a PAM encoding scheme. The selection of the combination of amplitudes for the first and second pulses may be based on a desired mode of communication.

The use of a modified SSC as disclosed herein permits the implementation of different packet structures. In some examples, packet structures may be configured to optimize an RFFE mode of communication by reducing transaction latencies, increasing throughput and/or prioritizing transactions. Packet structures may be configured based on application characteristics, such that a variety of unique and more efficient data packet structures can be provided. Packet structures may be configured to provide smaller packets, variable packet sizes, faster communication, high speed transaction for an entire frame, and to reduce worst-case bus hold-up time.

Configurable Ultra-Short Datagrams

In certain aspects of this disclosure, the structure of datagrams transmitted over an RFFE bus after transmission of a low-latency, or modified SSC may be configured to meet design objectives associated with the RFEE bus and/or specific devices coupled to the RFFE bus, including messaging latency. In various embodiments, components of the header and the payload size may be configured to meet design objectives.

Figure 9:
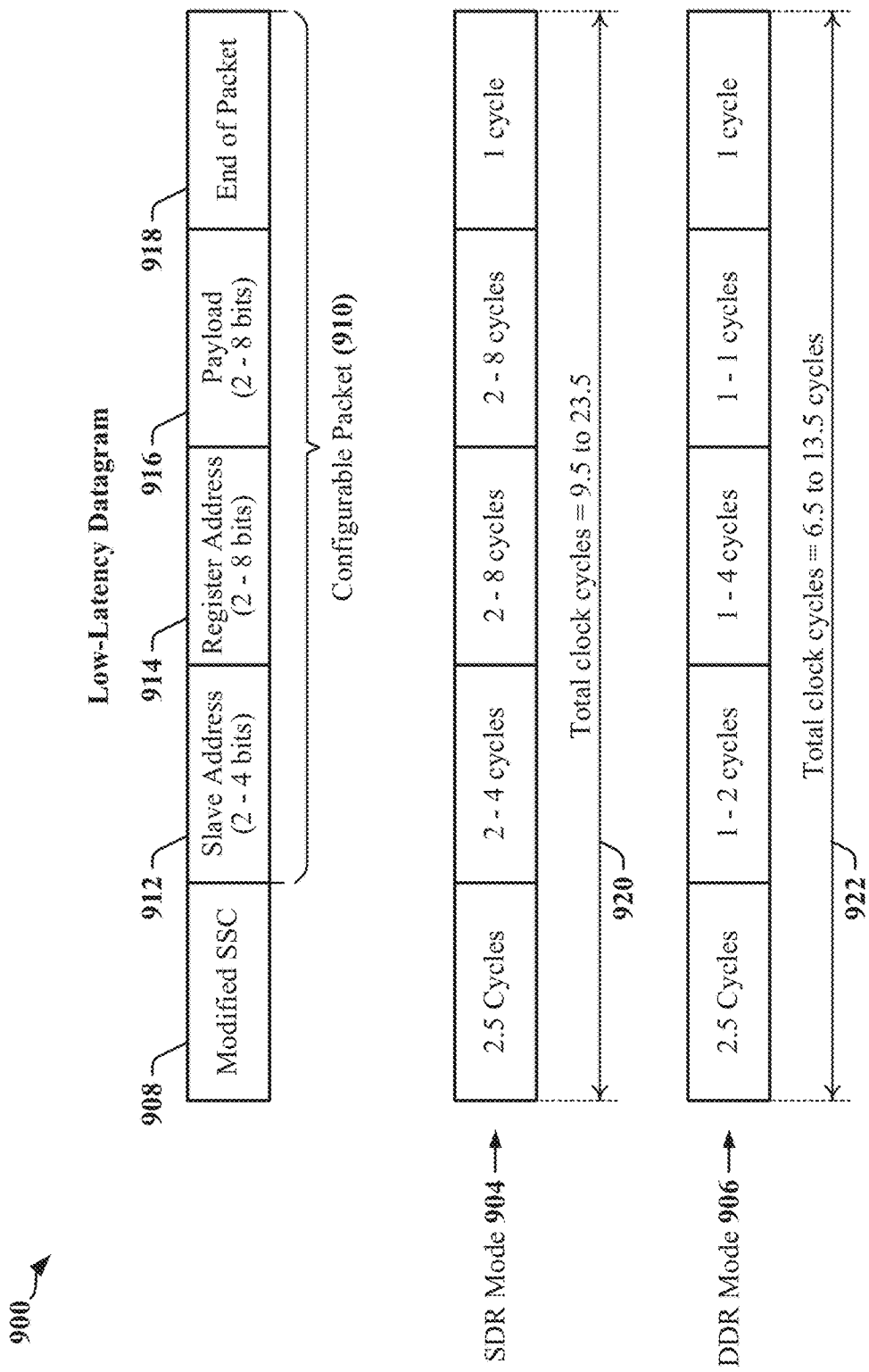
FIG. 9 illustrates a configurable ultra-short RFFE datagram that may be transmitted over an RFFE bus in accordance with certain aspects disclosed herein.

FIG. 9 illustrates an example of a configurable datagram 900 that may be transmitted over an RFFE bus. The datagram 900 includes a modified SSC 908, followed by a packet 910 that includes a slave address 912, a register address 914, a payload 916 and a termination 918 that indicates end-of-packet and/or end-of-datagram. In some instances, the packet 910 may include a parity bit. The modified SSC 908 may correspond to the modified SSC 612 of FIG. 6 or the modified SSC 800 of FIG. 8.

The transmission of the modified SSC 908 may indicate that the low-latency packet 910 follows. In one example, the slave address 912 may be configured to include between two and four bits, permitting the datagram to be addressable to between four and sixteen slave devices, and the register address 914 supports a register addressing space size of 4 to 256 registers within the addressed slave device. The payload 916 may include between 2 and 8 bits. The latency associated with the datagram 900 may be expressed in the number of clock cycles required to transmit the datagram 900. The SSC 908 and termination 918 are typically transmitted within a fixed number of clock cycles, while the address and payload fields 912, 914, 916 may be transmitted in SDR mode 904 or DDR mode 906. SDR transmissions use effectively twice the clock cycles required for DDR transmissions. Accordingly, the clock overhead 920 used to transmit the datagram 900 in SDR mode 904 ranges between 9.5 and 23.5 cycles, while the clock overhead 922 used to transmit the datagram 900 in DDR mode 906 ranges between 6.5 and 13.5 cycles. Table 2 illustrates the latency in microseconds calculated for SDR mode 904 and DDR mode 906 for different clock frequencies.

TABLE 2

| Clock Frequency | Clock Period | 6.5 cycle DDR Latency | 9.5 cycle DDR Latency | 13.5 cycle SDR Latency | 23.5 cycle SDR Latency |
|---|---|---|---|---|---|
| 19.2 MHz | 52.08 ns | 0.339 μs | 0.495 μs | 0.703 μs | 1.224 μs |
| 38.4 MHz | 26.04 ns | 0.169 μs | 0.247 μs | 0.352 μs | 0.612 μs |
| 76.8 MHz | 13.02 ns | 0.085 μs | 0.124 μs | 0.176 μs | 0.306 μs |

The maximum-sized SDR Latency at 19.2 MHz exceeds 1 μs, but all other latencies in the example illustrated in Table 2 are less than 1 μs. The use of configurable ultra-short datagrams provides low latency at the cost of payload size and/or slave device address ranges. According to certain aspects, the datagram 900 may be configured to support a wide range of applications. An RFFE interface may be statically or dynamically configured using pre-configured registers that are associated with a target slave device.

Figure 10:
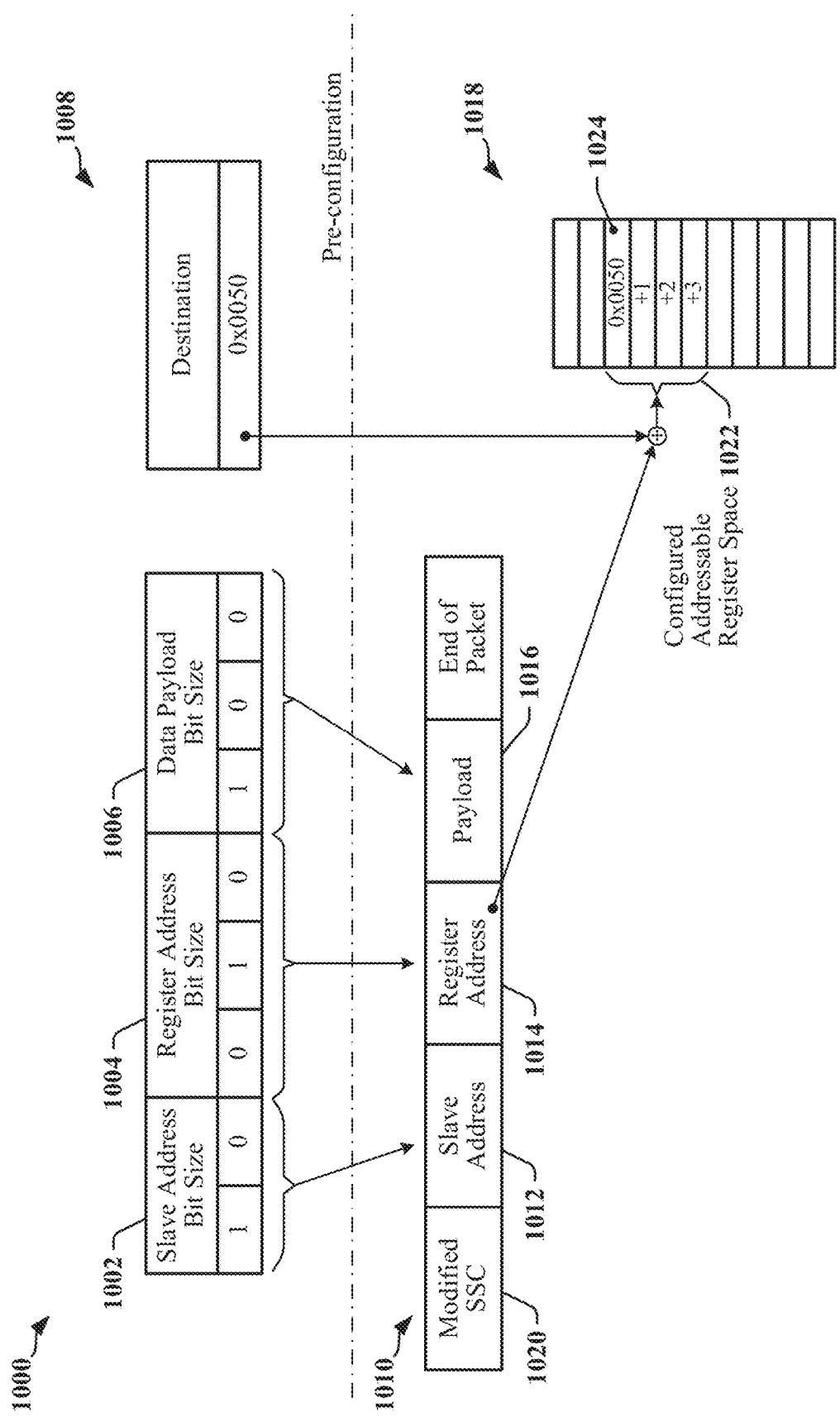
FIG. 10 illustrates an example of the use of pre-configuration registers to configure the structure of an ultra-short RFFE datagram provided in accordance with certain aspects disclosed herein.

FIG. 10 illustrates an example of the use of pre-configuration registers 1000, 1008 to configure the structure of an ultra-short, low-latency datagram 1010. In the example, a first pre-configuration register 1000 includes a 2-bit portion 1002 that defines the size of the slave address 1012 in a low-latency datagram 1010, a first 3-bit portion 1004 that defines the size of the register address 1014 in the low-latency datagram 1010, and a second 3-bit portion 1006 that defines the size of the payload 1016 in the low-latency datagram 1010. In one example, the first pre-configuration register 1000 may be statically configured at system startup or during manufacture and/or assembly. In another example, the first pre-configuration register 1000 may be dynamically configured by an application on a master device. In one example, the first pre-configuration register 1000 may be one of a plurality of configuration registers available for selection based on secondary encoding of the modified SSC 1020, where the secondary encoding may be based on duty cycle of the pulses forming the modified SSC 1020, and/or amplitude modulation of the pulses forming the modified SSC 1020.

In a master device, the first pre-configuration register 1000 may be referenced to construct a low-latency datagram 1010 when low-latency data is to be transmitted to a slave device. In some instances, different configurations may be defined for different slave devices. In some instances, a configuration of modified SSC 1020 may be retrieved by the master device, along with the configuration of the low-latency datagram 1010. Pre-configuration registers 1000, 1008 in a slave device may be written by a master device. The slave device may decode information in low-latency datagrams 1010 using the pre-configuration registers 1000, 1008. In some instances, one of a plurality of sets of pre-configuration registers 1000, 1008 may be selected based on secondary information encoded in the modified SSC 1020.

Certain register addressing limitations resulting from the shortened register address 1014 in an ultra-short, low-latency datagram 1010 may be ameliorated using indirect addressing. For example, a destination base address may be stored in the second pre-configuration register 1008, which may define a base or start address 1024 in a register map 1018 of the slave device. In the illustrated example, the second pre-configuration register 1008 is set to 0x0050, defining the base or start address 1024 of an addressable register space 1022 in the slave device. The size of the addressable register space 1022 may be defined by the first 3-bit portion 1004 of the first pre-configuration register 1000. A specific register may be addressed by summing the content of the second pre-configuration register 1008 and the content of the register address 1014 transmitted in a low-latency datagram 1010.

Figure 11:
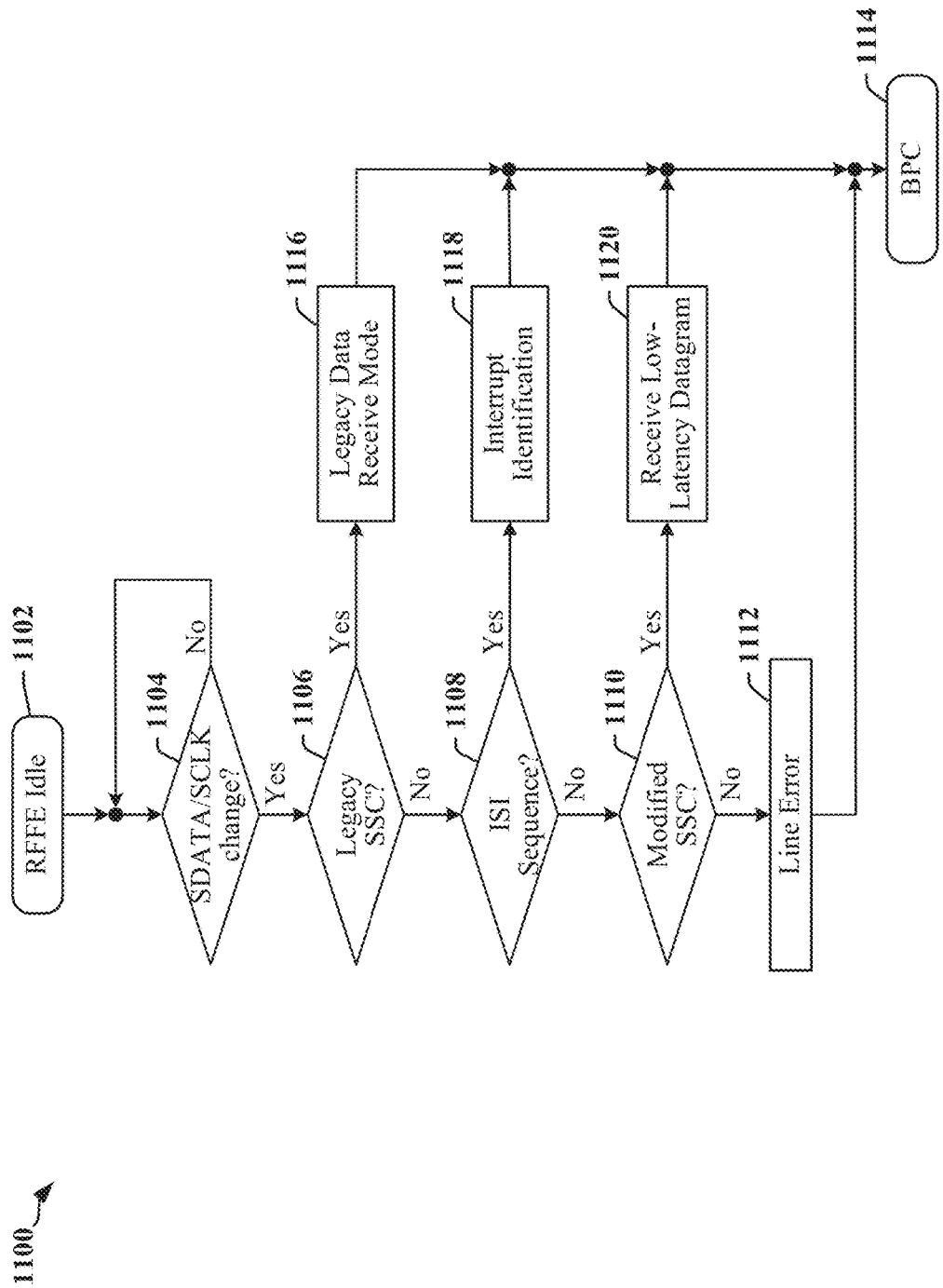
FIG. 11 illustrates a process implemented by receiving circuits in slave devices in order to handle signaling detected on an RFFE bus in accordance with certain aspects disclosed herein.

FIG. 11 illustrates a process 1100 implemented by receiving circuits in slave devices in order to handle signaling detected on an RFFE bus when the RFFE bus has been idled (at block 1102). At block 1104, a receiving circuit may monitor the wires of the serial bus until a change in signaling state is detected.

When a change in signaling state is detected, then at block 1106, the receiving circuit may determine whether a legacy SSC is being transmitted on the serial bus. If a legacy SSC is being transmitted, the receiving circuit may enter a legacy data transfer mode 1116. When the legacy data transfer mode 1116 has been completed a BPC 1114 may be transmitted on the serial bus.

At block 1108, the receiving circuit may determine whether an ISI sequence (see FIG. 7) is being transmitted. If an ISI sequence is being transmitted, the receiving circuit may enter an interrupt identification mode 1118. When the interrupt identification mode 1118 has been completed a BPC 1114 may be transmitted on the serial bus.

At block 1110, the receiving circuit may determine whether a legacy SSC is being transmitted on the serial bus. If a modified SSC 1020 is being transmitted, the receiving circuit may enter a low-latency datagram 1010 transfer mode 1120. When the low-latency datagram 1010 transfer mode 1120 has been completed a BPC 1114 may be transmitted on the serial bus.

At block 1112, the receiving circuit may determine that invalid signaling has been transmitted on the serial bus and may enter a line error handling mode. When the line error handling mode has been completed a BPC 1114 may be transmitted on the serial bus.

Example of a Modified SSC Used to Switch Mode of Operation

According to certain aspects disclosed herein, a modified SSC may be used to enable direct entry to HDR or DDR signaling. In one example, certain devices adapted to recognize the modified SSC may enter an HDR mode immediately after the modified SSC is transmitted on an RFFE bus, while legacy RFFE devices coupled to the RFFE bus ignore the modified SSC and the HDR transmissions that follow the modified SSC. A modified SSC may be defined for RFFE interfaces and for other interfaces that use a multi-wire bus. For example, a modified SSC may be defined for interfaces that operate in accordance with I2C and/or I3C protocols, and derivatives of such protocols.

With reference again to FIG. 8, certain characteristics of a modified SSC 800 may be exploited to encode information related to mode of communication, protocol, link control, etc. The modified SSC 800 may be provided as a pulse 806 transmitted on SDATA 802 while a pulse 808 is transmitted on SCLK 804. The pulse 808 on SCLK 804 has a duration that is greater than the duration of the pulse 806 on SDATA 802. Information may be encoded in a duty cycle 820 corresponding to the ratio of the duration of the pulses 806, 808. In the illustrated example, the duty cycle 820 may be calculated by dividing the duration (B 818) of the pulse 806 on SDATA 802 by the total time (A 816 added to A' 820) by which the duration of the pulse 808 on SCLK 804 exceeds the duration of the pulse 806 on SDATA 802. The various durations may be measured using counters, timers, or the like. For example, a system clock may be gated to two counters by logic, where first logic enables a first counter when SCLK 804 is in a high logic state and SDATA 802 is in a low logic state, and enables a second counter when SCLK 804 is in a high logic state and SDATA 802 is also in a high logic state. At the end of the modified SSC 800, the output of the first counter represents the divisor (A+A') and the output of the second counter represents the dividend (B).

In some examples, four different duty cycles (DC-1, DC-2, DC-3, DC-4) can be defined with sufficient guard band to prevent misidentification or miscalculation of the duty cycle. In these examples, a receiver may be configured to recognize four unique SSCs using the same baseline signaling scheme. The different SSCs may be used to indicate a mode of communication to be entered after the SSC has been terminated. Table 3 illustrates one example of communication mode selection based on duty cycle.

TABLE 3

| Duty Cycle | Communication Mode |
|---|---|
| DC-1 | DDR |
| DC-2 | Ternary (Transition encoding) |
| DC-3 | DDR with Pulse amplitude modulation |
| DC-4 | DDR with Ternary |

In some implementations, an interface may be configurable to encode data using pulse amplitude modulation (PAM). In these implementations, a PAM-based modified SSC may be used to facilitate direct entry by a device into one or more modes of communication. For example, a PAM-based modified SSC may be provided by transmitting a first pulse with a first amplitude and transmitting a second pulse with a second amplitude, where the first and second amplitudes are defined by a PAM encoding scheme. The selection of the combination of amplitudes for the first and second pulses may be based on a desired mode of communication. In some instances, one of a plurality of possible modes of communication may be initiated based on the ratio of the first and second amplitudes. Table 4 illustrates an example of communication mode selection based on duty cycle.

TABLE 4

| Amplitude Ratio | Communication Mode |
|---|---|
| AR-1 | DDR |
| AR-2 | Ternary (Transition encoding) |
| AR-3 | DDR with Pulse amplitude modulation |
| AR-4 | DDR with Ternary |

A receiving device may be adapted to respond to a PAM-based modified SSC by selecting a mode of communication indicated by the amplitude ration of pulses transmitted in the modified SSC. In one example, the receiving device may measure a first amplitude associated with the first pulse and a second amplitude associated with the second pulse. The receiving device may initiate a high-speed mode of communication indicated by the ratio of the first and second amplitudes.

The use of a modified SSC as disclosed herein permits the implementation of different packet structures. In some examples, packet structures may be configured to optimize an RFFE mode of communication by reducing transaction latencies, increasing throughput and/or prioritizing transactions. Packet structures may be configured based on application characteristics, such that a variety of unique and more efficient data packet structures can be provided. Packet structures may be configured to provide smaller packets, variable packet sizes, faster communication, high speed transaction for an entire frame, and to reduce worst-case bus hold-up time.

Figure 12:
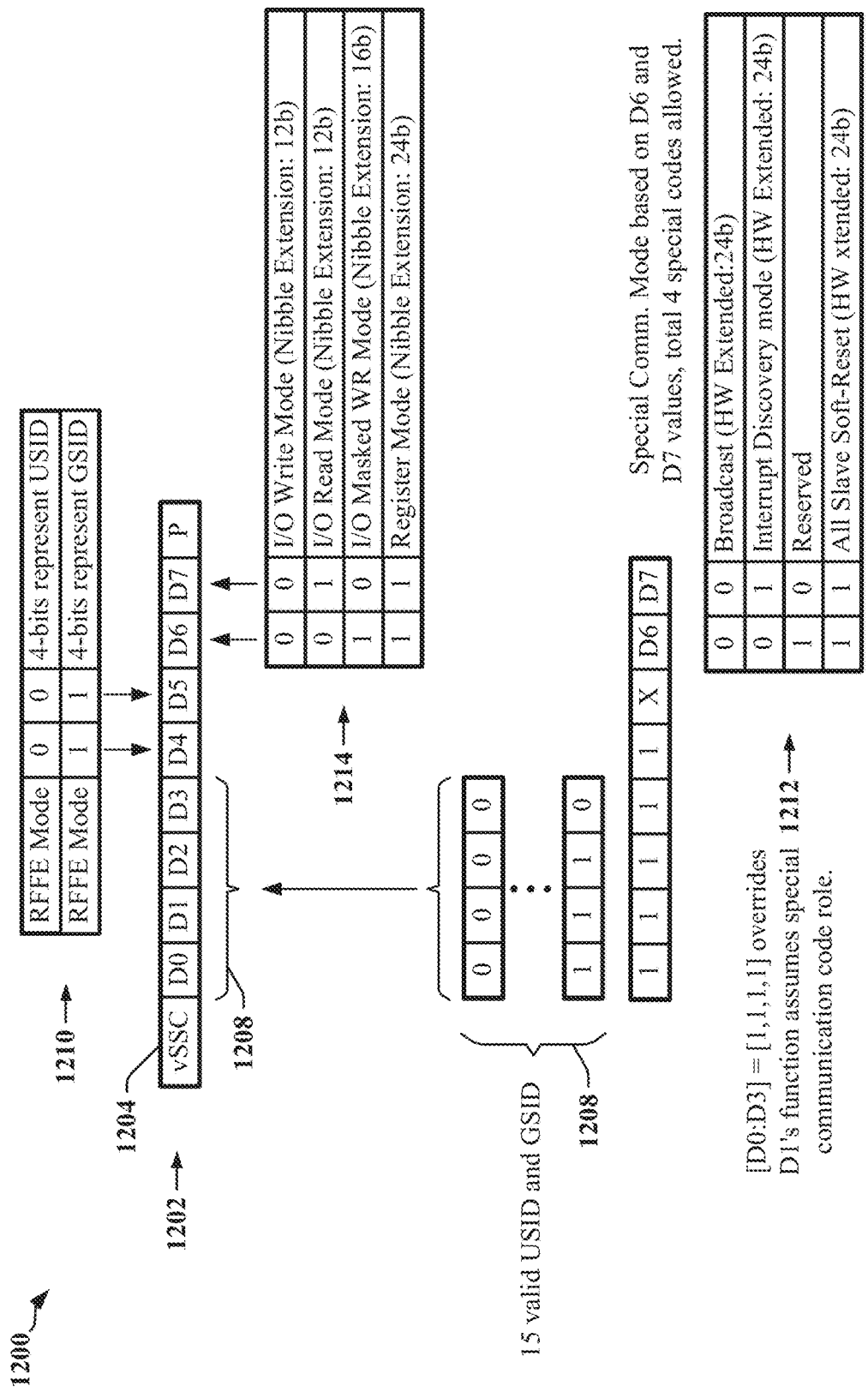
FIG. 12 illustrates an example of transaction initiation using a versatile sequence start condition in accordance with certain aspects disclosed herein.
Figure 13:
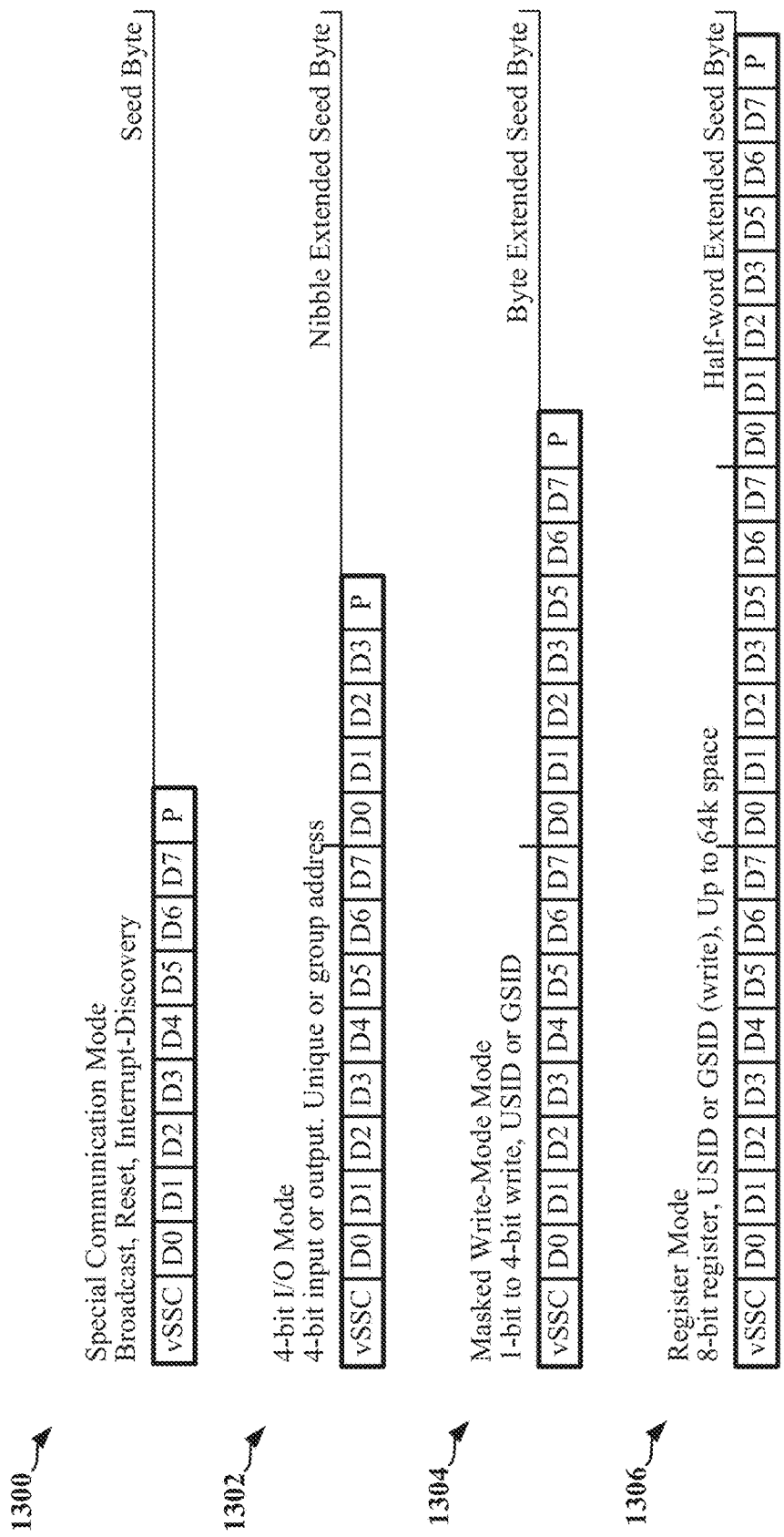
FIG. 13 illustrates examples of frame structures that may be selected using a versatile sequence start condition in accordance with certain aspects disclosed herein.

FIGS. 12 and 13 illustrate an example of a packet structure 1200 that may be optimized to accomplish system design objectives. In FIG. 12, a transaction may be initiated using a modified SSC (vSSC 1204) that indicates to a receiver a high-speed mode of communication is to be used for the transaction. The type of high-speed mode of communication may be indicated using duty cycle of the vSSC 1204. A plurality of bits following the vSSC 1204 may define a specific operation to be performed in the transaction. In the example, a first four bits 1208 carries a group slave identifier (GSID) or a unique slave identifier (USID), based on the value of two bits that define RFFE mode 1210.

The RFFE mode may also indicate whether one of a plurality of special communication modes 1212 is to be enabled. Otherwise, a normal communication mode 1214 may be enabled based on certain bit values. FIG. 13 illustrates certain examples of frame structures 1300, 1302, 1304 and 1306 that may be selected using the encoding shown in FIG. 12.

Examples of Processing Circuits and Methods

Figure 14:
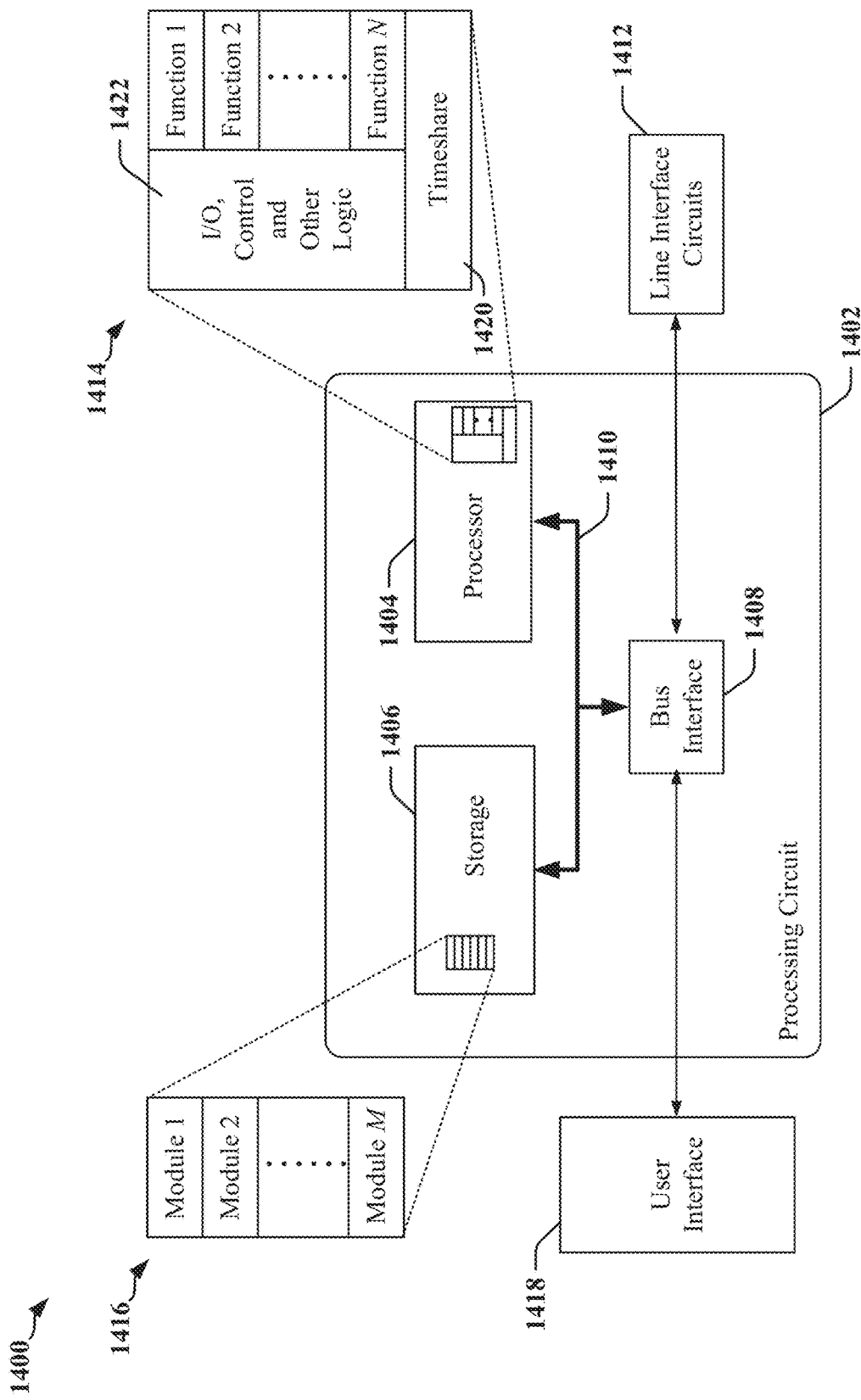
FIG. 14 is a block diagram illustrating an example of an apparatus employing a processing circuit that may be adapted according to certain aspects disclosed herein.

FIG. 14 is a conceptual diagram illustrating a simplified example of a hardware implementation for an apparatus 1400 employing a processing circuit 1402 that may be configured to perform one or more functions disclosed herein. In accordance with various aspects of the disclosure, an element, or any portion of an element, or any combination of elements as disclosed herein may be implemented using the processing circuit 1402. The processing circuit 1402 may include one or more processors 1404 that are controlled by some combination of hardware and software modules. Examples of processors 1404 include microprocessors, microcontrollers, digital signal processors (DSPs). ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1404 may include specialized processors that perform specific functions, and that may be configured, augmented or controlled by one of the software modules 1416. The one or more processors 1404 may be configured through a combination of software modules 1416 loaded during initialization, and further configured by loading or unloading one or more software modules 1416 during operation.

In the illustrated example, the processing circuit 1402 may be implemented with a bus architecture, represented generally by the bus 1410. The bus 1410 may include any number of interconnecting buses and bridges depending on the specific application of the processing circuit 1402 and the overall design constraints. The bus 1410 links together various circuits including the one or more processors 1404, and storage 1406. Storage 1406 may include memory devices and mass storage devices, and may be referred to herein as computer-readable media and/or processor-readable media. The bus 1410 may also link various other circuits such as timing sources, timers, peripherals, voltage regulators, and power management circuits. A bus interface 1408 may provide an interface between the bus 1410 and one or more transceivers 1412. A transceiver 1412 may be provided for each networking technology supported by the processing circuit. In some instances, multiple networking technologies may share some or all of the circuitry or processing modules found in a transceiver 1412. Each transceiver 1412 provides a means for communicating with various other apparatus over a transmission medium. Depending upon the nature of the apparatus 1400, a user interface 1418 (e.g., keypad, display, speaker, microphone, joystick) may also be provided, and may be communicatively coupled to the bus 1410 directly or through the bus interface 1408.

A processor 1404 may be responsible for managing the bus 1410 and for general processing that may include the execution of software stored in a computer-readable medium that may include the storage 1406. In this respect, the processing circuit 1402, including the processor 1404, may be used to implement any of the methods, functions and techniques disclosed herein. The storage 1406 may be used for storing data that is manipulated by the processor 1404 when executing software, and the software may be configured to implement any one of the methods disclosed herein.

One or more processors 1404 in the processing circuit 1402 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1406 or in an external computer readable medium. The external computer-readable medium and/or storage 1406 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1406 may also include, by way of example, a carrier wave, a transmission line, and any other suitable medium for transmitting software and/or instructions that may be accessed and read by a computer. Computer-readable medium and/or the storage 1406 may reside in the processing circuit 1402, in the processor 1404, external to the processing circuit 1402, or be distributed across multiple entities including the processing circuit 1402. The computer-readable medium and/or storage 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1406 may maintain software maintained and/or organized in loadable code segments, modules, applications, programs, etc., which may be referred to herein as software modules 1416. Each of the software modules 1416 may include instructions and data that, when installed or loaded on the processing circuit 1402 and executed by the one or more processors 1404, contribute to a run-time image 1414 that controls the operation of the one or more processors 1404. When executed, certain instructions may cause the processing circuit 1402 to perform functions in accordance with certain methods, algorithms and processes described herein.

Some of the software modules 1416 may be loaded during initialization of the processing circuit 1402, and these software modules 1416 may configure the processing circuit 1402 to enable performance of the various functions disclosed herein. For example, some software modules 1416 may configure internal devices and/or logic circuits 1422 of the processor 1404, and may manage access to external devices such as the transceiver 1412, the bus interface 1408, the user interface 1418, timers, mathematical coprocessors, and so on. The software modules 1416 may include a control program and/or an operating system that interacts with interrupt handlers and device drivers, and that controls access to various resources provided by the processing circuit 1402. The resources may include memory, processing time, access to the transceiver 1412, the user interface 1418, and so on.

One or more processors 1404 of the processing circuit 1402 may be multifunctional, whereby some of the software modules 1416 are loaded and configured to perform different functions or different instances of the same function. The one or more processors 1404 may additionally be adapted to manage background tasks initiated in response to inputs from the user interface 1418, the transceiver 1412, and device drivers, for example. To support the performance of multiple functions, the one or more processors 1404 may be configured to provide a multitasking environment, whereby each of a plurality of functions is implemented as a set of tasks serviced by the one or more processors 1404 as needed or desired. In one example, the multitasking environment may be implemented using a timesharing program 1420 that passes control of a processor 1404 between different tasks, whereby each task returns control of the one or more processors 1404 to the timesharing program 1420 upon completion of any outstanding operations and/or in response to an input such as an interrupt. When a task has control of the one or more processors 1404, the processing circuit is effectively specialized for the purposes addressed by the function associated with the controlling task. The timesharing program 1420 may include an operating system, a main loop that transfers control on a round-robin basis, a function that allocates control of the one or more processors 1404 in accordance with a prioritization of the functions, and/or an interrupt driven main loop that responds to external events by providing control of the one or more processors 1404 to a handling function.

Figure 15:
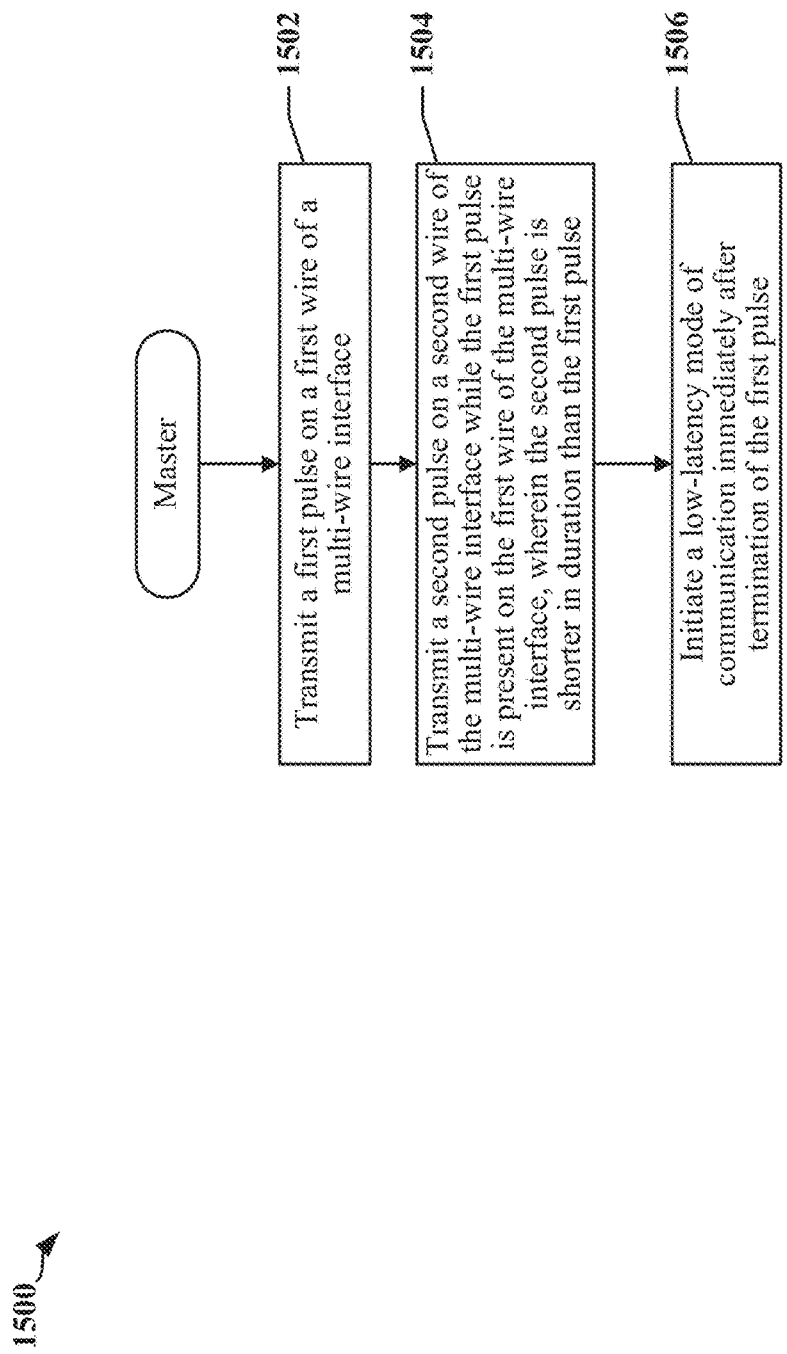
FIG. 15 is a flow chart of a first method of data communication performed at a bus master device adapted in accordance with certain aspects disclosed herein.

FIG. 15 is a flow chart 1500 of a method of communication using a serial communication link. The method may be performed at a device operating as a bus master.

At block 1502, the device may transmit a first pulse on a first wire of a multi-wire interface.

At block 1504, the device may transmit a second pulse on a second wire of the multi-wire interface while the first pulse is present on the first wire of the multi-wire interface. The second pulse may be shorter in duration than the first pulse.

At block 1506, the device may initiate a low-latency mode of communication immediately after termination of the first pulse.

In certain examples, the device may configure a register that defines structure of a datagram to be transmitted during the low-latency mode of communication. In one example, configuring the register that defines the structure of the datagram may include configuring a number of bits to represent a slave device address in the datagram. The slave device address may be represented by between 2 and 4 bits. In another example, configuring the register that defines the structure of the datagram may include configuring a number of bits to represent a register address in the datagram. The register device address may be represented by between 2 and 8 bits. In another example, configuring the register that defines the structure of the datagram may include configuring a destination register that identifies a base register in a block of registers to be addressed using the register address in the datagram. The base register may be used with an index value to identify a target register in the block of registers. In another example, configuring the register that defines the structure of the datagram may include configuring a number of bits to carry a payload in the datagram. The payload may be carried in between 2 and 8 bits.

In some instances, the device may write the register that defines the structure of the datagram to at least one slave device. The datagram may be transmitted using double-data rate encoding.

In some examples, the device may select a configuration for a datagram to be transmitted during the low-latency mode of communication. A difference in durations (i.e., a duty cycle) of the first pulse and the second pulse indicates the selected configuration of the datagram.

In one example, and apparatus that can implement the methods or processes illustrated in FIG. 15 may include a bus interface adapted to couple the apparatus to a serial bus, and a processing circuit. The processing circuit may be configured to transmit a first pulse on a first wire of a multi-wire interface, transmit a second pulse on a second wire of the multi-wire interface while the first pulse is present on the first wire of the multi-wire interface, and initiate a low-latency mode of communication immediately after termination of the first pulse. The second pulse is shorter in duration than the first pulse.

The processing circuit may be adapted to configure a register that defines structure of a datagram to be transmitted during the low-latency mode of communication. The processing circuit may be adapted to configure the register that defines the structure of the datagram by configuring a number of bits to represent a slave device address or a register address transmitted in the datagram. The processing circuit may be adapted to configure the register that defines the structure of the datagram by configuring a number of bits to carry a payload in the datagram.

Figure 16:
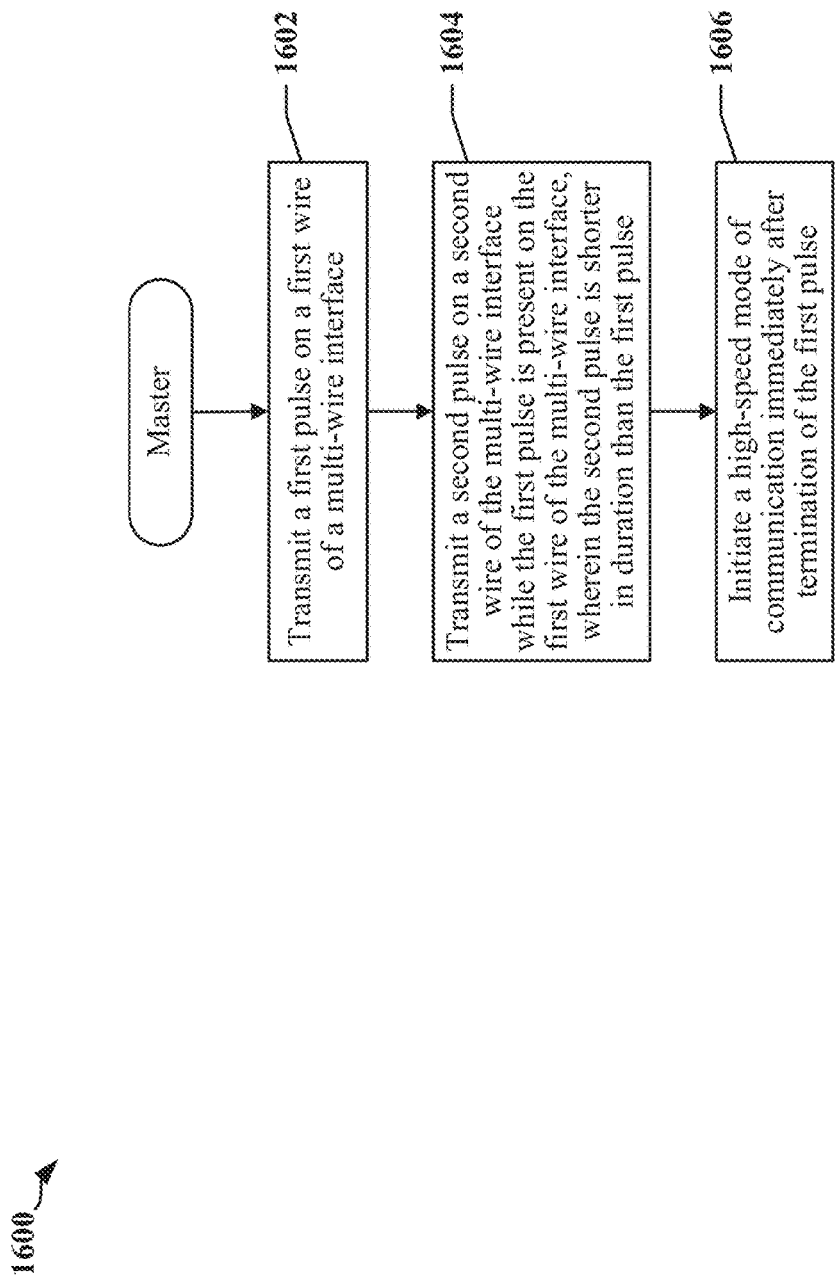
FIG. 16 is a flow chart of a second method of data communication performed at a bus master device adapted in accordance with certain aspects disclosed herein.

FIG. 16 is a flow chart 1600 of a method of communication using a serial communication link. The method may be performed at a device operating as a bus master.

At block 1602, the device may transmit a first pulse on a first wire of a multi-wire interface.

At block 1604, the device may transmit a second pulse on a second wire of the multi-wire interface while the first pulse is present on the first wire of the multi-wire interface. The second pulse may be shorter in duration than the first pulse.

At block 1606, the device may initiate a high-speed mode of communication immediately after termination of the first pulse.

In some examples, the device may configure the first pulse to have a first duration, configure the second pulse to have a second duration, and select the high-speed mode of communication from a plurality of modes of communication based on a ratio calculated from the first duration and the second duration. The plurality of modes of communication includes a double-data rate mode of communication, a transition encoded mode of communication, and/or a pulse amplitude modulation mode of communication.

In some examples, the device may configure the first pulse to have a first amplitude, configure the second pulse to have a second amplitude, and select the high-speed mode of communication from a plurality of modes of communication based on a ratio of the first and second amplitudes. The plurality of modes of communication may include a pulse amplitude modulation mode of communication, a transition encoded mode of communication, and/or a double-data rate mode of communication.

In some examples, the device may transmit a third pulse on the second wire of the multi-wire interface while the first wire of the multi-wire interface is maintained at logic low, and initiate a low-speed mode of communication immediately after termination of the third pulse. The device may configure a first frame structure used for communicating information in the high-speed mode of communication that is different from a second frame structure used for communicating information in the low-speed mode of communication. The device may transmit mode information in the low-speed mode of communication to cause the multi-wire interface to transition to a double-data-rate communication mode, and configure the multi-wire interface to use the second frame structure when operating in the double-data-rate communication mode.

In one example, the interface in a radio frequency front end interface. In another example, the interface is an I3C interface.

Figure 17:
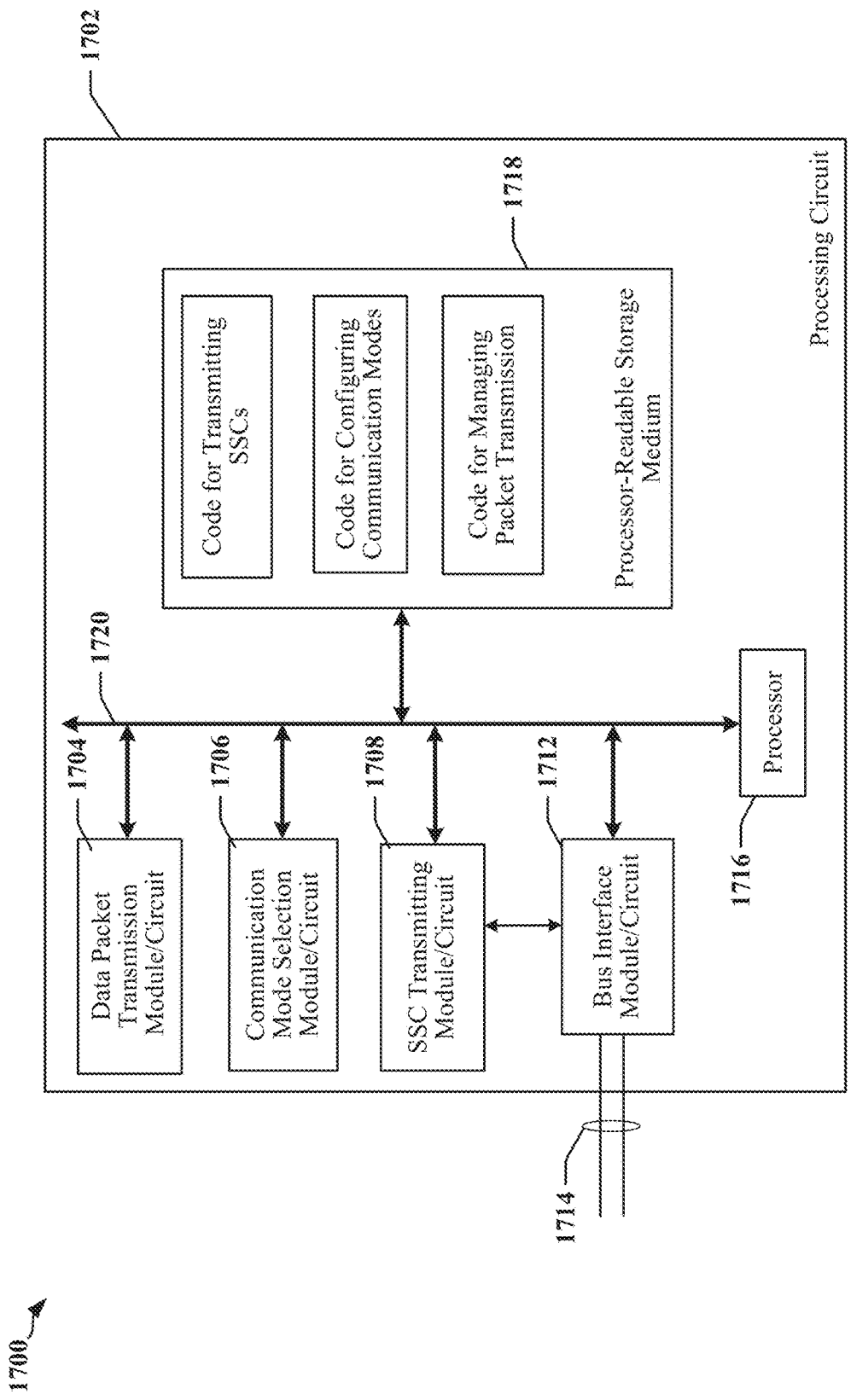
FIG. 17 is a diagram illustrating an example of a hardware implementation for a transmitting apparatus and employing a processing circuit adapted according to certain aspects disclosed herein.

FIG. 17 is a diagram illustrating a simplified example of a hardware implementation for an apparatus 1700 employing a processing circuit 1702. The processing circuit typically has a processor 1716 that may include one or more of a microprocessor, microcontroller, digital signal processor, a sequencer and a state machine. The processing circuit 1702 may be implemented with a bus architecture, represented generally by the bus 1720. The bus 1720 may include any number of interconnecting buses and bridges depending on the specific application of the processing circuit 1702 and the overall design constraints. The bus 1720 links together various circuits including one or more processors and/or hardware modules, represented by the processor 1716, the modules or circuits 1704, 1706, 1708, line interface circuits 1712 configurable to support communication over connectors or wires 1714 and the computer-readable storage medium 1718. The bus 1720 may also link various other circuits such as timing sources, peripherals, voltage regulators, and power management circuits, which are well known in the art, and therefore, will not be described any further.

The processor 1716 is responsible for general processing, including the execution of software stored on the computer-readable storage medium 1718. The software, when executed by the processor 1716, causes the processing circuit 1702 to perform the various functions described supra for any particular apparatus. The computer-readable storage medium may also be used for storing data that is manipulated by the processor 1716 when executing software, including data decoded from symbols transmitted over the connectors or wires 1714, which may be configured as data lanes and clock lanes. The processing circuit 1702 further includes at least one of the modules 1704, 1706 and 1708. The modules 1704, 1706, and 1708 may be software modules running in the processor 1716, resident/stored in the computer-readable storage medium 1718, one or more hardware modules coupled to the processor 1716, or some combination thereof. The modules 1704, 1706, and/or 1708 may include microcontroller instructions, state machine configuration parameters, or some combination thereof.

In one configuration, the apparatus 1700 for wireless communication includes a module and/or circuit 1708 that is configured to transmit signaling corresponding to one or more SSCs through multi-wire line interface circuits 1712, a module and/or circuit 1706 configured to select between modes of communication, and a module and/or circuit 1704 configured to transmit data in packets through the line interface circuits 1712.

Figure 18:
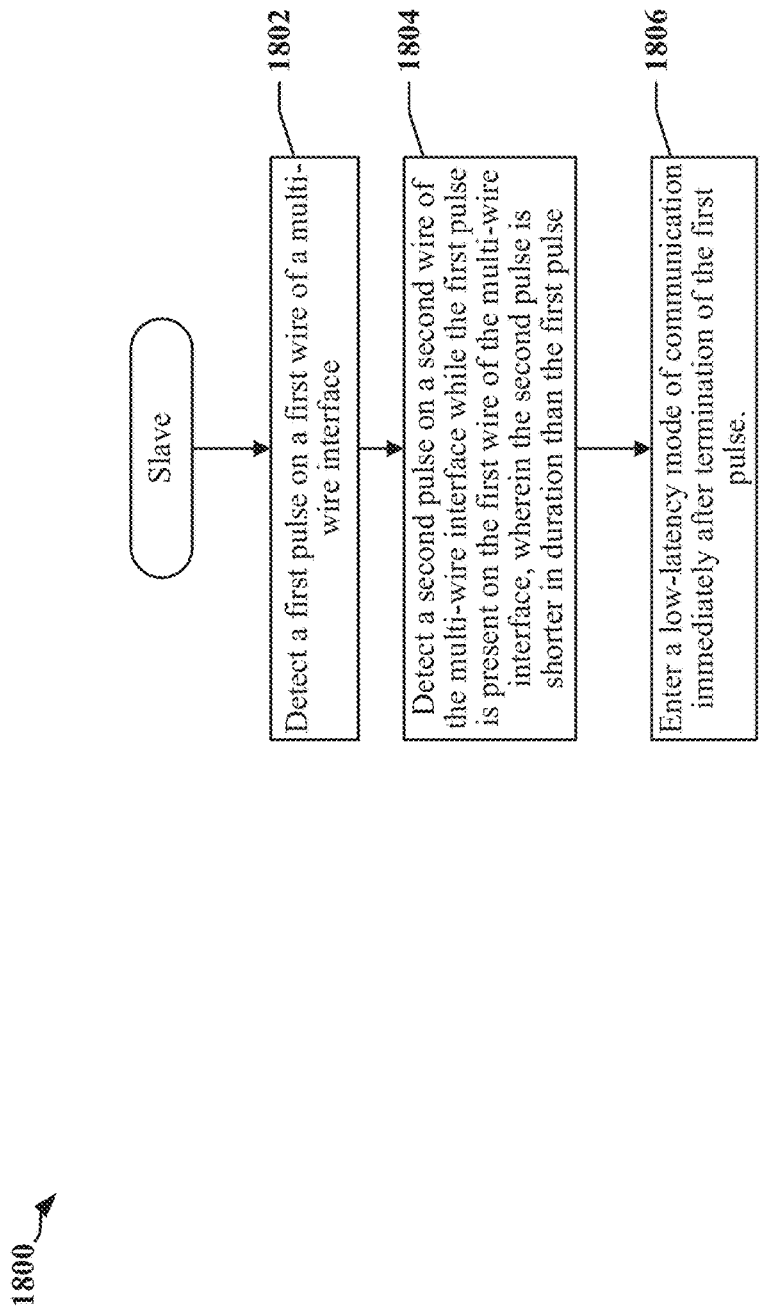
FIG. 18 is a flow chart of a first method of data communication performed at a slave device adapted in accordance with certain aspects disclosed herein.

FIG. 18 is a flow chart 1800 of a method of communication that may be performed at a slave device coupled to a bus. At block 1802, the slave device may detect a first pulse on a first wire of a multi-wire interface.

At block 1804, the slave device may detect a second pulse on a second wire of the multi-wire interface while the first pulse is present on the first wire of the multi-wire interface. The second pulse may be shorter in duration than the first pulse.

At block 1806, the slave device may enter a low-latency mode of communication immediately after termination of the first pulse.

In various examples, the slave device may determine a structure of a datagram transmitted during the low-latency mode of communication from bit settings of a first configuration register. The first configuration register may define a number of bits used to represent an address transmitted in the datagram. In one example, the first configuration register defines a number of bits used to represent a slave address transmitted in the datagram. The slave address may be represented in a field that has a length of between 2 and 4 bits. In a second example, the first configuration register defines a number of bits used to represent a register address in the datagram. The register address is represented in a field that has a length of between 2 and 8 bits.

In some examples, the register address in the datagram is used to identify a target register in a block of registers. The block of registers may commence at an address identified by a second configuration register. The slave device may write payload data transmitted in the datagram to the target register. The slave device may use the register address in the datagram to identify a target register in a block of registers. The block of registers may commence at an address identified by a second configuration register. The slave device may transmit data read from the target register as payload data in the datagram.

In some examples, the first configuration register defines a number of bits used to carry a payload in the datagram. The payload may be carried in a field of the datagram that includes between 2 and 8 bits. The datagram may be transmitted using double-data rate encoding.

An apparatus that can perform the methods disclosed herein may include a bus interface adapted to couple the apparatus to a serial bus, a plurality of configuration registers, and a processing circuit. The processing circuit may be configured to detect a first pulse on a first wire of a multi-wire interface, detect a second pulse on a second wire of the multi-wire interface while the first pulse is present on the first wire of the multi-wire interface, and cause the bus interface to enter a low-latency mode of communication immediately after termination of the first pulse. The second pulse may be shorter in duration than the first pulse.

In certain examples, the processing circuit is adapted to determine a structure of a datagram transmitted during the low-latency mode of communication from bit settings of a first configuration register. The first configuration register may define a number of bits used to represent an address transmitted in the datagram. The first configuration register may define a number of bits used to represent a slave address or a register address transmitted in the datagram. In one example, the number of bits lies between 2 and 8 bits.

In various examples, the apparatus includes a block of bus-accessible registers. A register address in the datagram is used to identify a target register in a block of bus-accessible registers. The block of bus-accessible registers may commence at an address identified by a second configuration register. In one example, the processing circuit is adapted to write payload data transmitted in the datagram to the target register. In another example, the processing circuit is adapted to transmit data read from the target register as payload data in the datagram.

Figure 19:
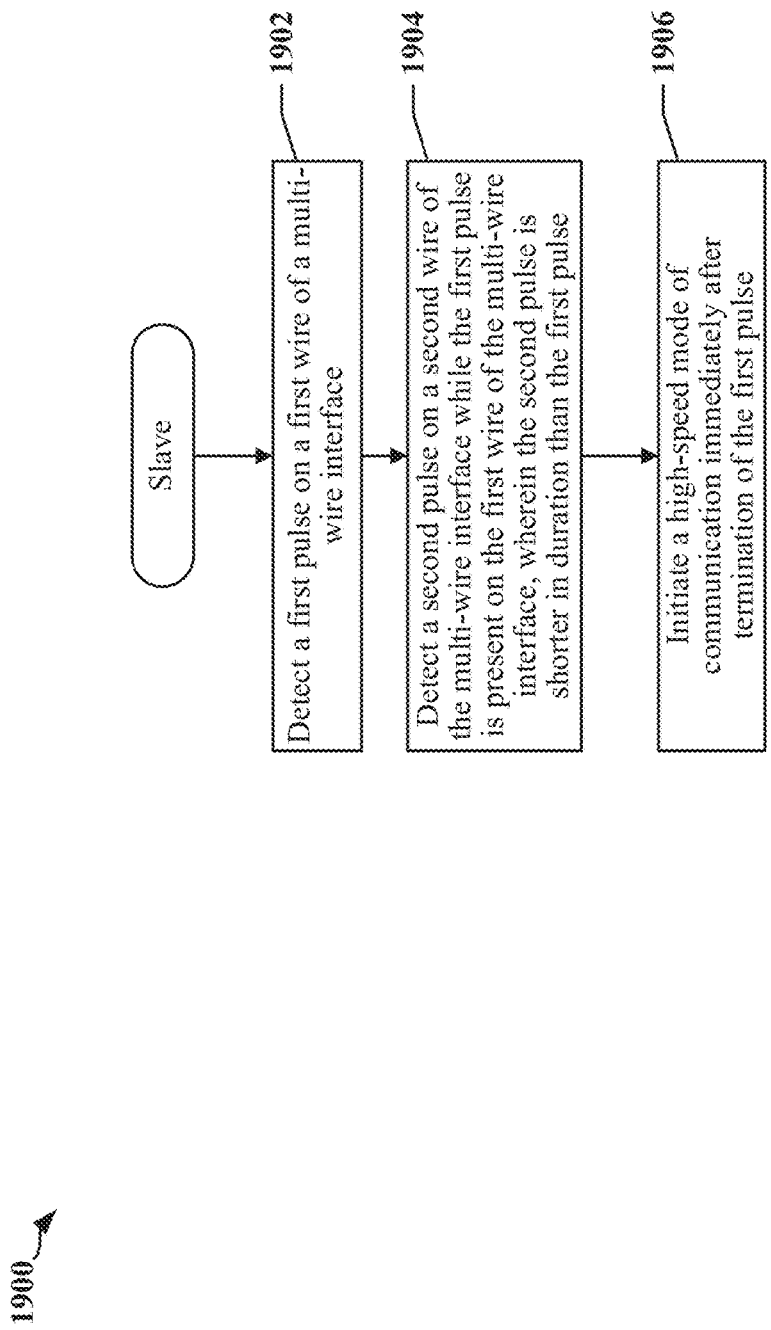
FIG. 19 is a flow chart of a second method of data communication performed at a slave device adapted in accordance with certain aspects disclosed herein.

FIG. 19 is a flow chart 1900 of a method of communication that may be performed at a slave device coupled to a serial bus.

At block 1902, the slave device may detect a first pulse on a first wire of a multi-wire interface.

At block 1904, the slave device may detect a second pulse on a second wire of the multi-wire interface while the first pulse is present on the first wire of the multi-wire interface. The second pulse may be shorter in duration than the first pulse.

At block 1906, the slave device may initiate a high-speed mode of communication immediately after termination of the first pulse.

In some examples, the slave device may measure a first duration associated with the first pulse, measuring a second duration associated with the second pulse, and select selecting the high-speed mode of communication from a plurality of modes of communication based on a ratio calculated from the first duration and the second duration. The plurality of modes of communication may include a double-data rate mode of communication, a transition encoded mode of communication, and/or a pulse amplitude modulation mode of communication.

In some examples, the slave device may measure a first amplitude associated with the first pulse, measure a second amplitude associated with the second pulse, and select the high-speed mode of communication from a plurality of modes of communication based on a ratio of the first and second amplitudes. The plurality of modes of communication may include a pulse amplitude modulation mode of communication, a transition encoded mode of communication, and/or a double-data rate mode of communication.

In some examples, the slave device may detect a third pulse on the second wire of the multi-wire interface while the first wire of the multi-wire interface is maintained at logic low, and initiate a low-speed mode of communication immediately after termination of the third pulse. The slave device may configure a first frame structure used for communicating information in the high-speed mode of communication that is different from a second frame structure used for communicating information in the low-speed mode of communication. The slave device may receive mode information in the low-speed mode of communication, transition the multi-wire interface to a double-data-rate communication mode after receiving the mode information, and configure the multi-wire interface to use the second frame structure when operating in the double-data-rate communication mode.

In one example, the interface in a radio frequency front end interface. In another example, the interface is an I3C interface.

Figure 20:
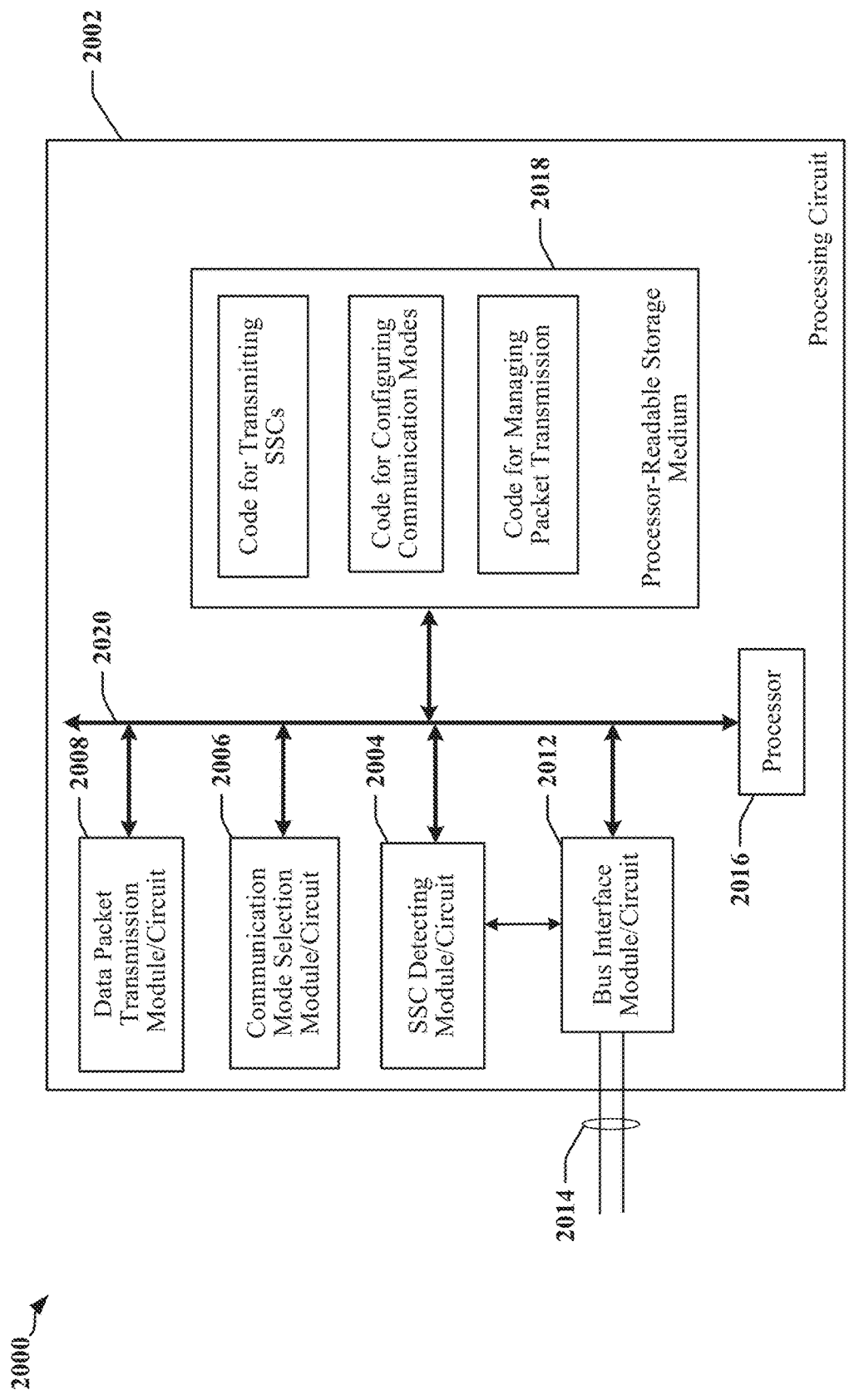
FIG. 20 is a diagram illustrating an example of a hardware implementation for a receiving apparatus and employing a processing circuit adapted according to certain aspects disclosed herein.

FIG. 20 is a diagram illustrating an example of a hardware implementation for an apparatus 2000 employing a processing circuit 2002. The processing circuit typically has a processor 2016 that may include one or more of a microprocessor, microcontroller, digital signal processor, a sequencer and a state machine. The processing circuit 2002 may be implemented with a bus architecture, represented generally by the bus 2020. The bus 2020 may include any number of interconnecting buses and bridges depending on the specific application of the processing circuit 2002 and the overall design constraints. The bus 2020 links together various circuits including one or more processors and/or hardware modules, represented by the processor 2016, the modules or circuits 2004, 2006, 2008, line interface circuits 2012 configurable to communicate over connectors or wires 2014 and the computer-readable storage medium 2018. The bus 2020 may also link various other circuits such as timing sources, peripherals, voltage regulators, and power management circuits, which are well known in the art, and therefore, will not be described any further.

The processor 2016 is responsible for general processing, including the execution of software stored on the computer-readable storage medium 2018. The software, when executed by the processor 2016, causes the processing circuit 2002 to perform the various functions described supra for any particular apparatus. The computer-readable storage medium may also be used for storing data that is manipulated by the processor 2016 when executing software, including data decoded from symbols transmitted over the connectors or wires 2014, which may be configured as data lanes and clock lanes. The processing circuit 2002 further includes at least one of the modules 2004, 2006, and 2008. The modules 2004, 2006, and 2008 may be software modules running in the processor 2016, resident/stored in the computer-readable storage medium 2018, one or more hardware modules coupled to the processor 2016, or some combination thereof. The modules 2004, 2006, and/or 2008 may include microcontroller instructions, state machine configuration parameters, or some combination thereof.

In one configuration, the apparatus 2000 for wireless communication includes a module and/or circuit 2008 that is configured to detect signaling corresponding to one or more SSCs on multi-wire line interface circuits 2012, a module and/or circuit 2006 configured to select between modes of communication, and a module and/or circuit 2004 configured to receive data in packets through the line interface circuits 2012.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method performed at a device operating as a bus master, comprising:
   configuring a slave device coupled to a multi-wire serial bus for entry to a low-latency mode of communication using signaling transmitted on the multi-wire serial bus, wherein the signaling includes a first pulse transmitted on a first wire of the multi-wire serial bus and a second pulse transmitted on a second wire of the multi-wire serial bus while the first pulse is present on the first wire of the multi-wire serial bus, wherein the second pulse is shorter in duration than the first pulse;
   initiating the low-latency mode of communication immediately after termination of the first pulse; and
   transmitting information to the slave device in a datagram, wherein the datagram is configured for the low-latency mode of communication.

2. The method of claim 1, further comprising:
   configuring a register that defines structure of the datagram; and
   transmitting the datagram during the low-latency mode of communication.

3. The method of claim 2, wherein configuring the register that defines the structure of the datagram includes:
   configuring a number of bits to represent a slave device address transmitted in the datagram.

4. The method of claim 3, wherein the slave device address is represented by between 2 and 4 bits.

5. The method of claim 2, wherein configuring the register that defines the structure of the datagram includes:
   configuring a number of bits to represent a register address transmitted in the datagram.

6. The method of claim 5, wherein the register address is represented by between 2 and 8 bits.

7. The method of claim 5, further comprising:
   configuring a destination register that identifies a base register in a block of registers to be addressed using the register address in the datagram.

8. The method of claim 2, wherein configuring the register that defines the structure of the datagram includes:
   configuring a number of bits to carry a payload in the datagram.

9. The method of claim 8, wherein the payload is carried in between 2 and 8 bits.

10. The method of claim 2, further comprising:
    writing the register that defines the structure of the datagram to at least one slave device.

11. The method of claim 2, further comprising:
    transmitting the datagram using double-data rate encoding.

12. The method of claim 2, further comprising:
    selecting a configuration for the datagram to be transmitted during the low-latency mode of communication, wherein a difference in durations of the first pulse and the second pulse indicates the selected configuration of the datagram.

13. An apparatus, comprising:
    a bus interface configured to couple the apparatus to a slave device through a serial bus; and
    a processing circuit configured to:
      configure the slave device coupled to the serial bus for entry to a low-latency mode of communication using signaling transmitted on the serial bus, wherein the signaling includes a first pulse transmitted on a first wire of the serial bus and a second pulse transmitted on a second wire of the serial bus while the first pulse is present on the first wire of the serial bus, wherein the second pulse is shorter in duration than the first pulse;
      initiate the low-latency mode of communication immediately after termination of the first pulse; and
      transmit information to the slave device in a datagram, wherein the datagram is configured for the low-latency mode of communication.

14. The apparatus of claim 13, wherein the processing circuit is further configured to:

configure a register that defines structure of the datagram; and transmit the datagram during the low-latency mode of communication.

15. The apparatus of claim 14, wherein the processing circuit configures the register that defines the structure of the datagram by:

configuring a number of bits to represent a slave device address or a register address transmitted in the datagram.

16. The apparatus of claim 14, wherein the processing circuit configures the register that defines the structure of the datagram by:

configuring a number of bits to carry a payload in the datagram.

17. A method performed at a slave device coupled to a multi-wire serial bus, comprising:

detecting a first pulse in signaling state of a first wire of the multi-wire serial bus;

detecting a second pulse in signaling state of a second wire of the multi-wire serial bus while the first pulse is present in the signaling state of the first wire of the multi-wire serial bus, wherein the second pulse is shorter in duration than the first pulse;

entering a low-latency mode of communication immediately after termination of the first pulse; and transmitting information to another device in a datagram configured for the low-latency mode of communication.

18. The method of claim 17, further comprising:

determining a structure of the datagram from bit settings of a first configuration register, wherein the first configuration register defines a number of bits used to represent an address transmitted in the datagram.

19. The method of claim 18, wherein the first configuration register defines a number of bits used to represent a slave address transmitted in the datagram, and wherein the slave address is represented in a field that has a length of between 2 and 4 bits.

20. The method of claim 18, wherein the first configuration register defines a number of bits used to represent a register address in the datagram, and wherein the register address is represented in a field that has a length of between 2 and 8 bits.

21. The method of claim 20, further comprising:

using the register address in the datagram to identify a target register in a block of registers, the block of registers commencing at an address identified by a second configuration register; and writing payload data transmitted in the datagram to the target register.

22. The method of claim 20, further comprising:

using the register address in the datagram to identify a target register in a block of registers, the block of registers commencing at an address identified by a second configuration register; and transmitting data read from the target register as payload data in the datagram.

23. The method of claim 18, wherein the first configuration register defines a number of bits used to carry a payload in the datagram.

24. The method of claim 23, wherein the payload is carried in between 2 and 8 bits of the datagram.

25. The method of claim 18, further comprising:

transmitting the datagram on the multi-wire serial bus using double-data rate encoding.

26. An apparatus, comprising:

a bus interface configured to couple the apparatus to a multi-wire serial bus;

a plurality of configuration registers; and a processing circuit configured to:

detect a first pulse in signaling state of a first wire of the multi-wire serial bus;

detect a second pulse in signaling state of a second wire of the multi-wire serial bus while the first pulse is present in the signaling state of the first wire of the multi-wire serial bus, wherein the second pulse is shorter in duration than the first pulse;

cause the bus interface to enter a low-latency mode of communication immediately after termination of the first pulse; and cause the bus interface to transmit information to another device in a datagram configured for the low-latency mode of communication.

27. The apparatus of claim 26, wherein the processing circuit is adapted further configured to:

determine a structure of the datagram from bit settings of a first configuration register, wherein the first configuration register defines a number of bits used to represent an address transmitted in the datagram.

28. The apparatus of claim 27, wherein the first configuration register defines a number of bits used to represent a slave address or a register address transmitted in the datagram, and wherein the number of bits lies between 2 and 8 bits.

29. The apparatus of claim 28, further comprising:

a block of bus-accessible registers, wherein the register address in the datagram is used to identify a target register in the block of bus-accessible registers, the block of bus-accessible registers commencing at an address identified by a second configuration register, and wherein the processing circuit is further configured to write payload data transmitted in the datagram to the target register.

30. The apparatus of claim 28, further comprising:

a block of bus-accessible registers, wherein the register address in the datagram is used to identify a target register in the block of bus-accessible registers, the block of bus-accessible registers commencing at an address identified by a second configuration register, and wherein the processing circuit is further configured to transmit data read from the target register as payload data in the datagram.

* * * * *